United States Patent [19]
Powell

[11] Patent Number: 6,019,348
[45] Date of Patent: Feb. 1, 2000

[54] QUICK-CONNECTION OF A FUEL FILL PIPE TO A FUEL TANK

[75] Inventor: Patrick Kenneth Powell, Lapeer, Mich.

[73] Assignee: Dana Corporation, Toledo, Ohio

[21] Appl. No.: 09/148,379

[22] Filed: Sep. 4, 1998

Related U.S. Application Data

[60] Provisional application No. 60/058,389, Sep. 8, 1997, and provisional application No. 60/077,234, Mar. 9, 1998.

[51] Int. Cl.[7] ........................................................ B65B 1/04
[52] U.S. Cl. .......................... 251/144; 141/46; 141/198; 220/86.2
[58] Field of Search ................................ 141/46, 98, 198, 141/67; 220/86.2; 251/144

[56] References Cited

U.S. PATENT DOCUMENTS

| | | | |
|---|---|---|---|
| 4,703,867 | 11/1987 | Schoenhard | 220/86.2 |
| 5,568,828 | 10/1996 | Harris | 220/86.2 |
| 5,829,619 | 11/1998 | Gupta et al. | 220/86.2 |

*Primary Examiner*—Steven O. Douglas
*Attorney, Agent, or Firm*—Reising, Ethington, Barnes, Kisselle, Learman & McCulloch, P.C.

[57] ABSTRACT

A quick-connect coupling assembly, and method of making same, for connecting a fuel fill pipe to a fuel tank made of a polyethylene based material. A mounting bracket subassembly has a base molded of such tank-type material that is plastic welded to the tank fill opening margin. A second more stable plastic material also is used in the bracket not only to anchor the connection between the fuel tank and the fill pipe and to provide the necessary resistance to pull force against disconnection, but also to contain the polyethylene bracket material in such a way as to minimize geometric (dimensional) changes due to fuel absorption and creep in the critical region of the connection that contains the O-ring seals or like sealing elements. Use of overmold fabrication and assembly procedures is preferably employed in the connector in such a way that the sealing package seals directly to the fuel tank material (such as HDPE) and still leaves a more robust material (such as acetate) for the interface between the mechanically locking mechanisms that form the actual connection. Preferably, an integral, tubular extension of one of two selected components of the quick connect construction provides an outlet spout protruding into the tank interior and housing a back-check valve operable to prevent fuel back flow and leakage into the fill pipe in an efficient, economical and reliable manner. The coupling O-ring seals are preferably disposed internal or near internal to the tank wall for purposes of crash protection, extending the service life and improving the sealing characteristics of the fuel tank to fuel pipe connection.

24 Claims, 11 Drawing Sheets

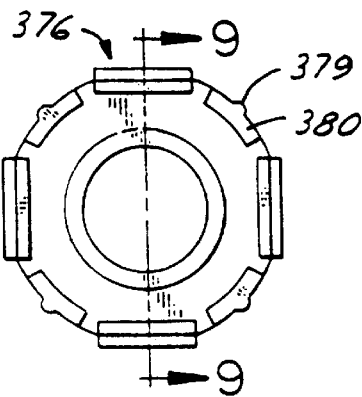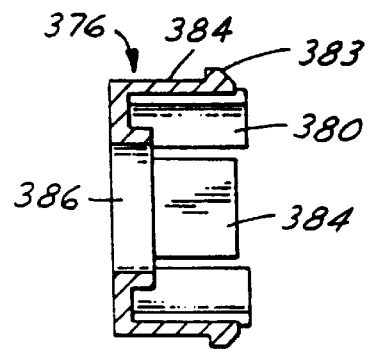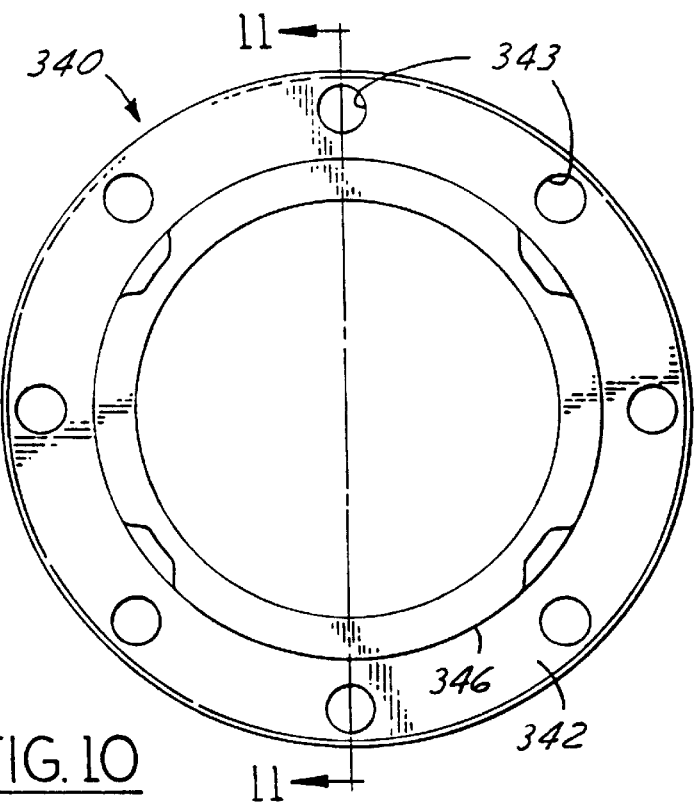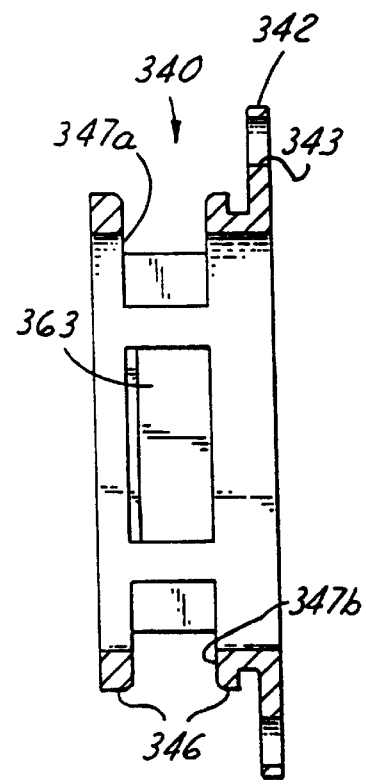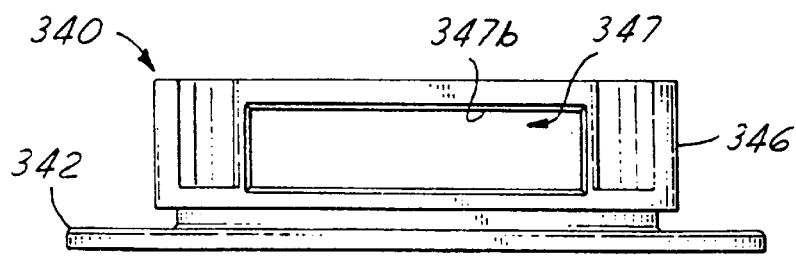
FIG. 8
FIG. 9
FIG. 10
FIG. 11
FIG. 12

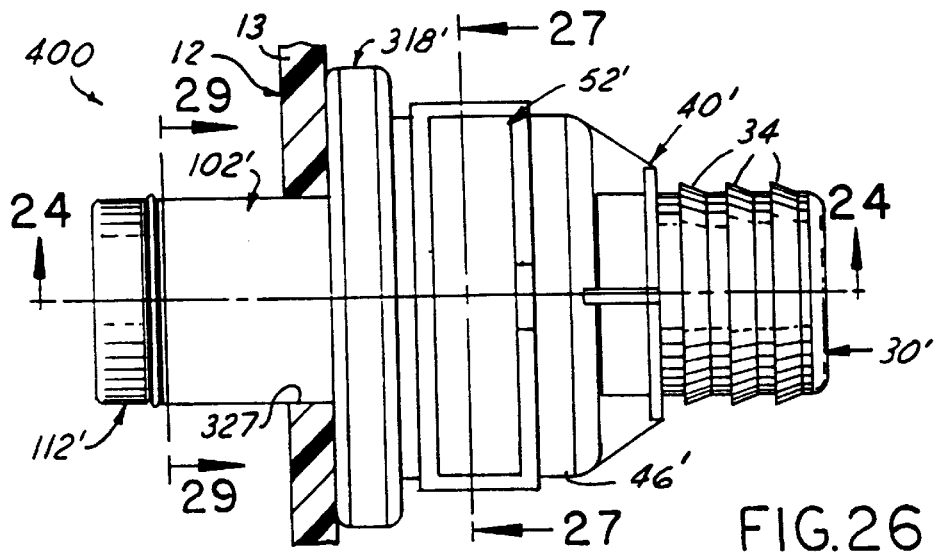
FIG.26
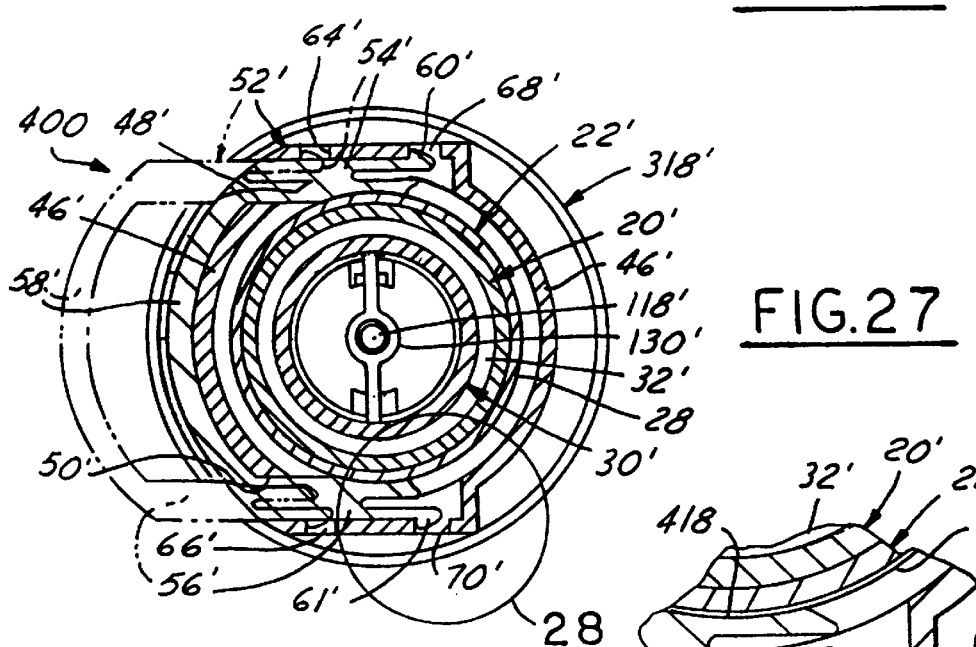
FIG.27
FIG.28
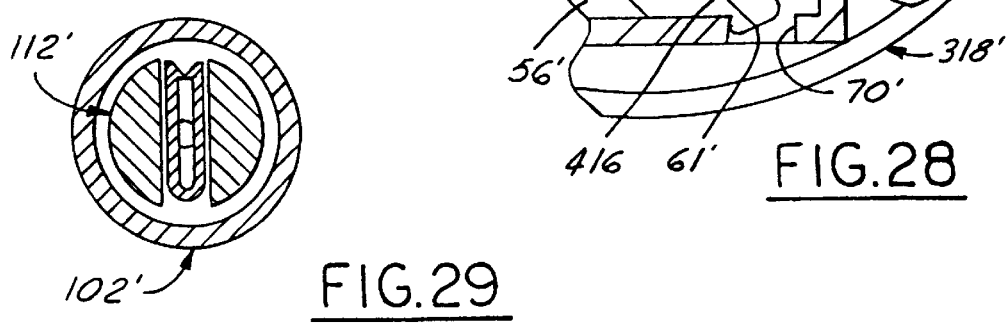
FIG.29

6,019,348

QUICK-CONNECTION OF A FUEL FILL PIPE TO A FUEL TANK

This is a United States regular utility patent application filed pursuant to 35 U.S.C. §111(a) and claiming the benefit pursuant to 35 U.S.C. §119(e)(1) of United States provisional applications Ser. No. 60/058,389 filed Sep. 8, 1997 and Ser. No. 60/077,234 filed Mar. 9, 1998.

FIELD OF THE INVENTION

The present invention is directed to fuel tank systems for automotive and similar applications, and more particularly to a connection between a fuel tank and a fuel pipe.

BACKGROUND OF THE INVENTION

Fuel tanks for automotive and similar applications are conventionally constructed of a polyethylene-based material composition. Materials of this composition possess a number of properties that are detrimental to forming a connection between the fuel tank and the fill pipe. Specifically, polyethylene-based materials tend to absorb fuel and to creep under load. The absorption of fuel causes the material to swell and change geometry. Creep, which is accelerated by absorption of fuel, allows the polyethylene material to change geometric form under constant or changing load. These two factors, which can alter the dimensional characteristics of the material, are not predictable in amount A connection between the fuel tank and the fill pipe must be predictable and of controllable geometry to ensure that sealing retention force is sufficient for proper function of the connection.

Moreover, once the fuel fill pipe and tank have been installed in the vehicle and are operable in use, there is still a need to prevent spit or well back after the refueling operation has stopped. There also remains a need to prevent fuel from leaving the fuel tank in the event that the fuel tank connection is compromised or the fill pipe develops a leak path. Hitherto various tank filling constructions of the prior art have incorporated some type of check valve to prevent such back flow of fuel from the tank into the filter pipe. Older versions of such check valves sometimes used a floating ball mechanism, but such a design is incapable of forming a leak-tight seal and is generally being phased out. More modem check valves provided for this purpose work by spring action holding an elastomeric seal type between the opposite sealing surfaces of the check valve construction.

OBJECTS OF THE INVENTION

It is therefore an object of the present invention to provide an improved fuel pipe-fuel tank quick-connect apparatus and improved method for making such a quick-connection of a fuel fill pipe to a fuel tank that is made of polyethylene or other suitable plastic material, such as that typically provided for automotive and similar applications, and that provides predictable and controllable geometry despite the tendency of the polyethylene-base material composition of the tank to absorb fuel and to creep under load, and that will remain stable over an extended operating lifetime and under a variety of operating conditions, achieves a firm and secure seal against escape of fuel liquid and vapor, and enables quick connection of the fuel pipe to the tank to facilitate manufacture and assembly and also quick disconnection to facilitate repair or replacement of the fuel tank, and enables the sealing elements to be better shielded by the tank itself.

Among the further objects of the present invention are to provide a back flow and leak preventing check valve construction that is economically integrally incorporated into the improved quick-connect, fuel fill pipe/tank structure that cooperates with the features of such quick-connect improvement and preserves the advantages thereof while satisfying the need for an efficient, inexpensive and reliable check valve construction operable to prevent fuel from leaving the fuel tank in the event that the fill pipe-to-fuel tank connection is compromised or the fill pipe develops a leak path, that satisfies the requirements fulfilled by prior fuel tank filling, back-flow preventing check valves for this purpose, and yet is of improved construction, assembly and operation thereover.

SUMMARY OF THE INVENTION

In general, and by way of summary description and not by way of imitation, the foregoing objectives are obtained in accordance with the present invention by utilizing a second more stable plastic material not only to anchor the connection between the fuel tank and the fill pipe and to provide the necessary resistance to pull force against disconnection, but also to contain the polyethylene material in such a way as to minimize geometric (dimensional) changes due to fuel absorption and creep in the critical region of the connection containing the O-ring seals or like sealing elements. In most disclosed embodiments, an integral, tubular extension of one of two selected components of the quick connect construction provides a tubular flow conduit spout protruding into the tank interior. The spout provides the tank-interior outlet of the fill pipe fuel flow path and also mounts and supports on its outlet end a spring-biased disk-type check valve operable to prevent fuel back flow and leakage into the fill pipe in an efficient, economical and reliable manner.

In the preferred embodiments, the sealing elements are disposed internal or near internal to the tank wall for purposes of crash protection, extending the service life and improving the sealing characteristics of the fuel tank to fuel pipe connection. Use of overmold fabrication and assembly procedures is employed in the connector in such a way that the sealing package seals directly to the fuel tank material and still leaves a more robust material for the interface between the mechanically locking mechanisms that form the actual connection.

BRIEF DESCRIPTION OF THE DRAWINGS

The invention, together with additional objects, features and advantages thereof, will be best understood from the following description, appended claims and accompanying drawings (which are to engineering scale unless otherwise indicated) in which:

FIG. 8 is an end elevational view of the dome clip bushing that snaps into the interior end of the check valve housing of the connector assembly, shown by itself, FIG. 9 is a cross-sectional view taken on the line 9—9 of FIG. 8;

FIG. 10 is an end elevational view of the clip-receiving connector shown by itself, as viewed looking from right to left in FIG. 7;

FIG. 11 is a cross-sectional view taken on the line 11—11 of FIG. 10;

FIG. 12 is a bottom plan view of the connector of FIG. 10;

FIG. 26 is an elevational view of the fifth embodiment fuel tank/fill pipe connection arrangement shown mounted to the wall of the fuel tank (shown fragmentarily in cross section);

FIG. 27 is a cross sectional view taken on the line 27—27 of FIG. 26;

FIG. 28 is a fragmentary greatly enlarged view of the portion of FIG. 27 encompassed by the circle 28;

FIG. 29 is a cross-sectional view taken along the line 29—29 of FIG. 26; and

DETAILED DESCRIPTION OF THE PREFERRED EMBODIMENTS

First Embodiment

Figure 1:
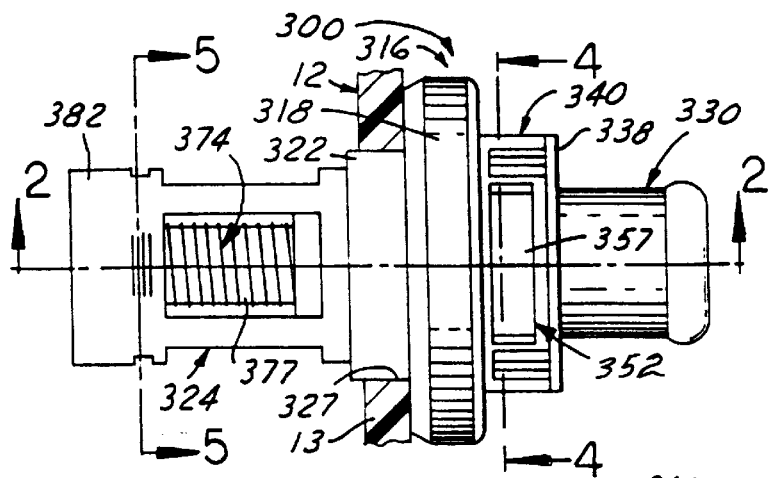
FIG. 1 is an elevational view of a presently preferred first embodiment of a fuel tank/fill pipe connection arrangement in accordance with the present invention.
Figure 2:
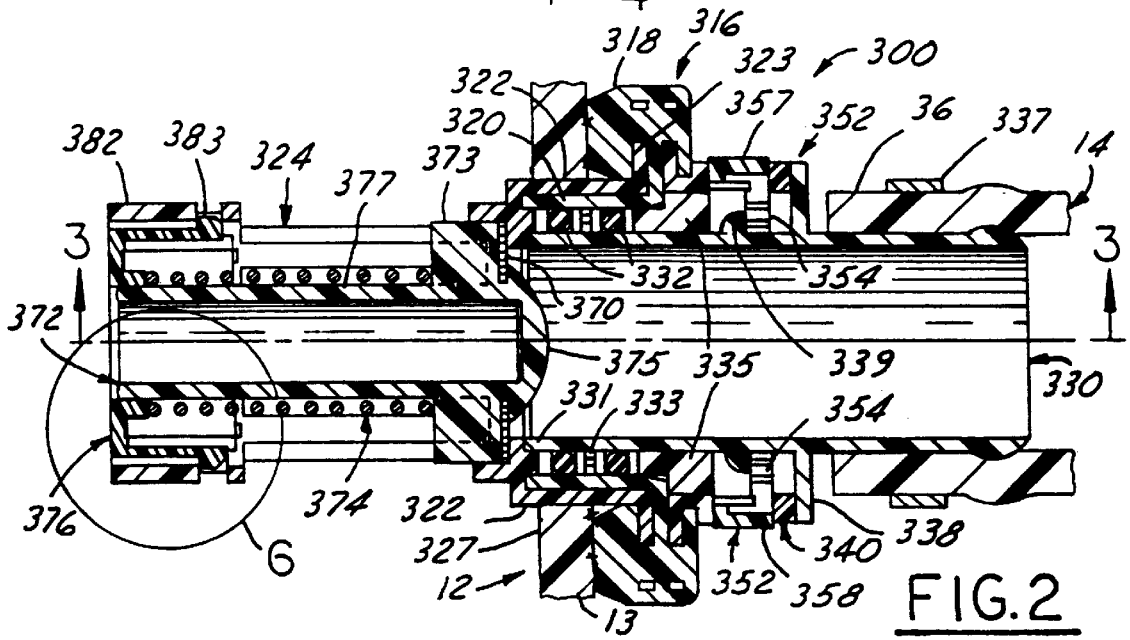
FIGS. 2 and 3 are respectively cross-sectional views taken on the lines 2—2 of FIG. 1 and 3—3 of FIG. 2 illustrating the connection arrangement mounted on the wall (shown fragmentarily) of an associated fuel tank and extending through a fitting opening in the wall into the interior fuel storage area of the tank.
Figure 3:
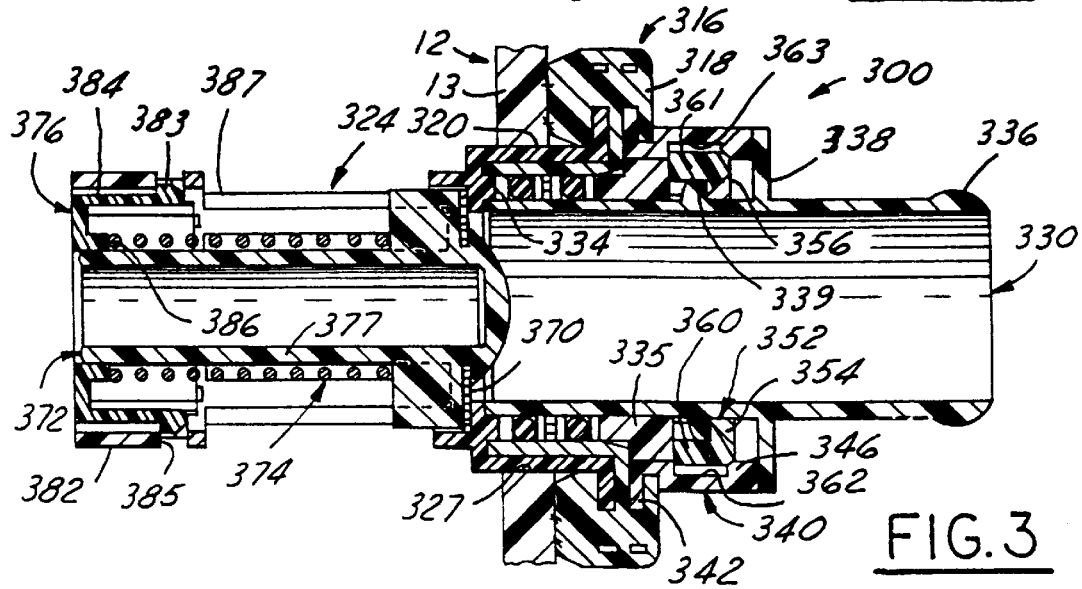
Figure 7:
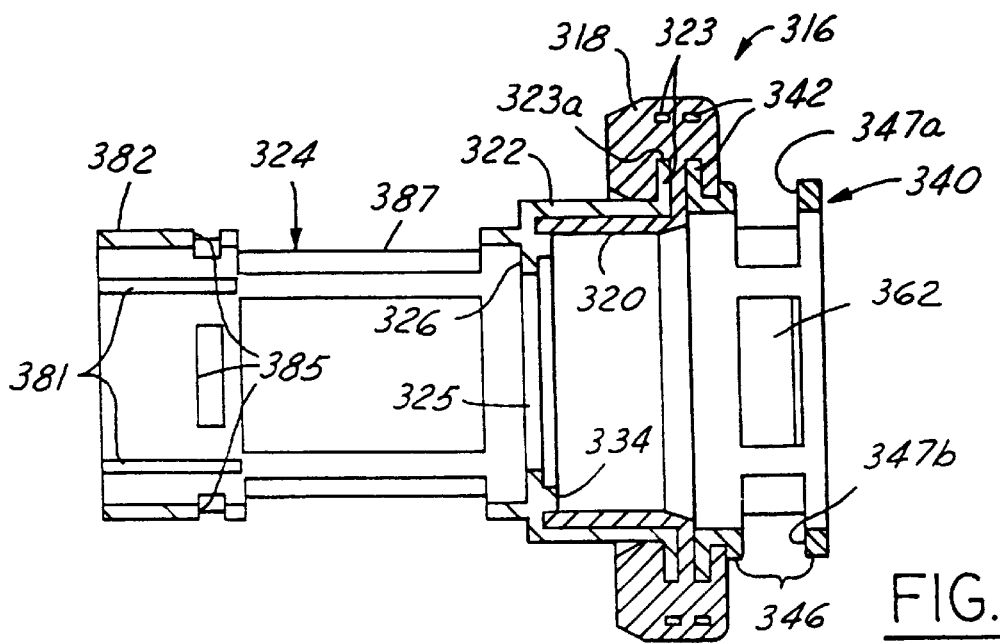
FIG. 7 is a cross-sectional view taken on the line 2—2 of FIG. 1 but showing only the overmold subassembly of the check valve housing, clip-receiving connector and overmolded base component 18 of the connector bracket subassembly.
Figure 13:
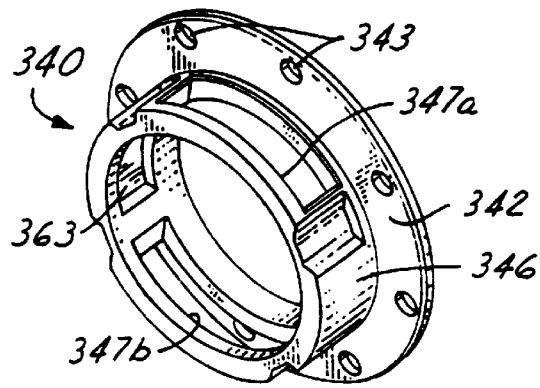
FIG. 13 is a perspective view of the connector of FIGS. 10–12.
Figure 14:
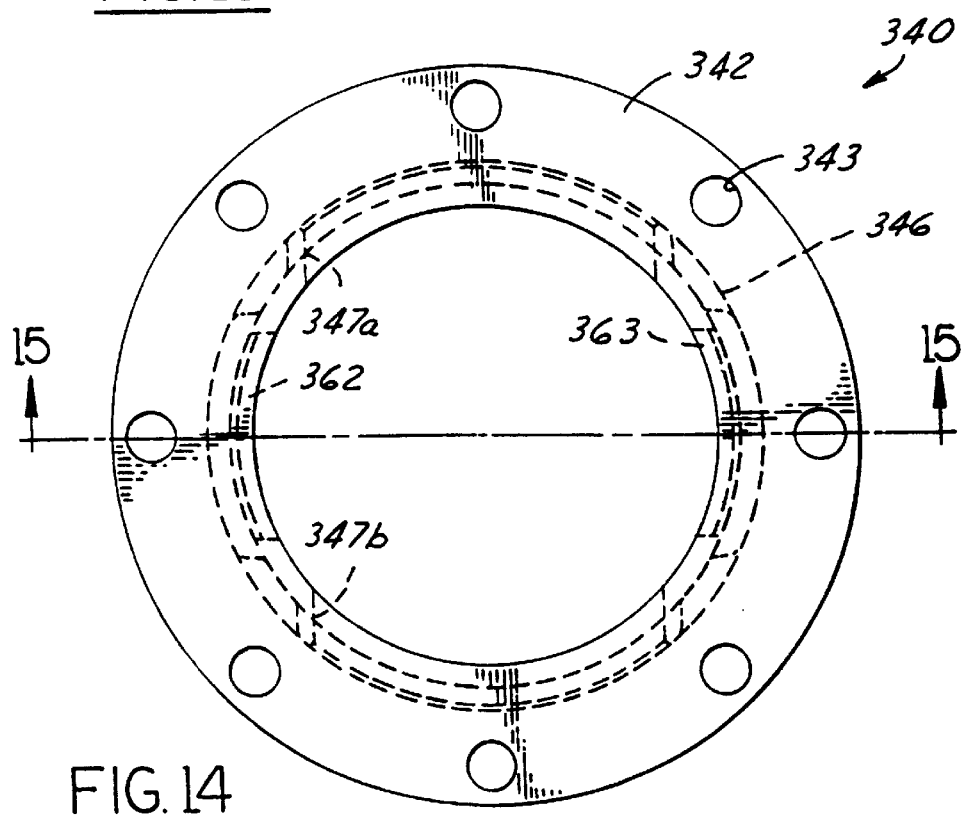
FIG. 14 is an end elevational view of the clip-receiving connector of FIGS. 10–13, as viewed looking from right to left in FIG. 11.
Figure 15:
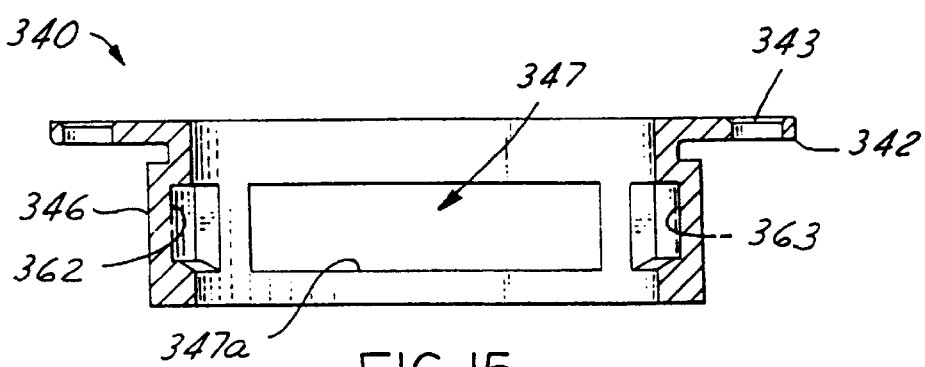
FIG. 15 is a cross-sectional view taken on the line 15—15 of FIG. 14.

FIGS. 1–16 illustrate a first embodiment representing a presently preferred arrangement or assembly 300 for making exterior connection between a polyethylene-based fuel tank 12 and a fill pipe 14 of plastic, rubber or other suitable composition. Connector arrangement 300 includes a mounting bracket 316 formed of a flat annular base portion 318, from the interior diameter of which a circumferentially continuous sleeve 320 coaxially and integrally extends. A circumferentially continuous anchor sleeve 322 is closely received over and surrounds sleeve 320 and has a right angle external flange 323 at its tank-exterior end overmold-embedded in base 318, as shown in FIGS. 2, 3 and 7. The tank-interior end of anchor sleeve 322 is integral with the adjacent end of valve housing 324 and an internal rib 325 thereof that provides a valve seat surface 326 (FIG. 7). Anchor sleeve 322 fits closely through a mating opening 327 in the associated wall 13 of tank 12 (FIGS. 1–3). Flange 323 is circumferentially continuous, as is rib 325 and also entrance opening 327 in tank wall 13, all of which cooperate to provide additional hoop strength to anchor sleeve 322 in close surrounding engagement with the sleeve 320 of bracket 316. Whereas bracket 316 is made of high density polyethylene composition similar to that fuel tank 12, anchor sleeve 322 is of the same composition as the remainder of valve housing 324 with which it is integral ("integral" as used herein means joined by being molded in one piece), which in turn is made of a suitable plastic composition such as acetate that is highly resistant to fuel absorption and creep. Thus, the circumferentially continuous geometry of anchor sleeve 322, coupled with the additional hoop strength provided by flange 323, the material of tank wall opening 327 and valve housing rib 326, strengthen and restrain base sleeve 320 of bracket 316 against geometric changes due to fuel absorption and/or creep to which the high density polyethylene composition is susceptible in use.

A hollow tubular core 330 extends through the inside diameter of bracket 316 and projects axially outwardly therefrom. The tank-end 331 of core 30 slidably and sealably engages at its outer periphery a pair of O-rings 332 that are radially compressed slightly and bear against the inner periphery or inner circumference of anchor sleeve 320. O rings 332 are maintained and separated by a spacer ring 333 having a clearance with the outer circumference of core end 331 and radially encompassed and compressed by anchor sleeve 320. O-rings 332 are axially confined by an annular shoulder 334 protruding from rib 325 of valve housing 324 (FIGS. 2, 3 and 7) that also overlaps the end 331 of core 330 in assembled abutment therewith. An externally notched locking ring 335 is press fit telescoped at its tank end into the outer end of anchor sleeve 320 to thereby confine O-rings 332 axially between shoulder 334 and the locking ring 335 in assembly. O-rings 332 are radially compressed in assembly by sealing engagement with the inner diameter of sleeve 320 of bracket 316 and the outer circumference of core 331. The portion of core 330 that extends axially outwardly from bracket 316 terminates in a radial enlargement in the form of a convex surface rib 336 and telescopically receives and retains the outlet end 36 of the plastic or rubber fuel pipe 14. Preferably hose end 36 is further sealably clamped on the outer protrusion of core 330 by a conventional hose clamp 337 (FIG. 2).

A hollow clip-receiving connector coupling 340 is provided as a component of bracket 316 and united by being overmolded in the formation of base 318. The structural details of connector coupling 340 are shown to engineering scale in the detailed views of FIGS. 10 through 15 of the drawings, which are incorporated herein by reference for brevity of description. The tank end of coupling 340 has a radially extending external flange 342 provided with an annular row of through-holes 343 infilled by the material of base 318 during overmolding. A circumferential wall or skirt 346 of connector coupling 340 extends axially and circumferentially around a central region of core 330 in assembly therewith (FIGS. 2 and 3) and is spaced radially outwardly therefrom as shown in FIGS. 2 and 3. A radial external flange 338 of core 330 abuts the outer end face of coupling 340 in assembly, and a somewhat smaller diameter external latching flange 339 is disposed within coupling 340 in assembly so as to be positioned therein as shown in FIGS. 2 and 3. Skirt wall 346 of coupling 340 has a rectangular through passageway 347, formed by diametrically opposite and radially aligned openings 347a and 347b (FIGS. 11–15), that radially aligns in assembly with latching flange 339 of core 330.

Figure 4:
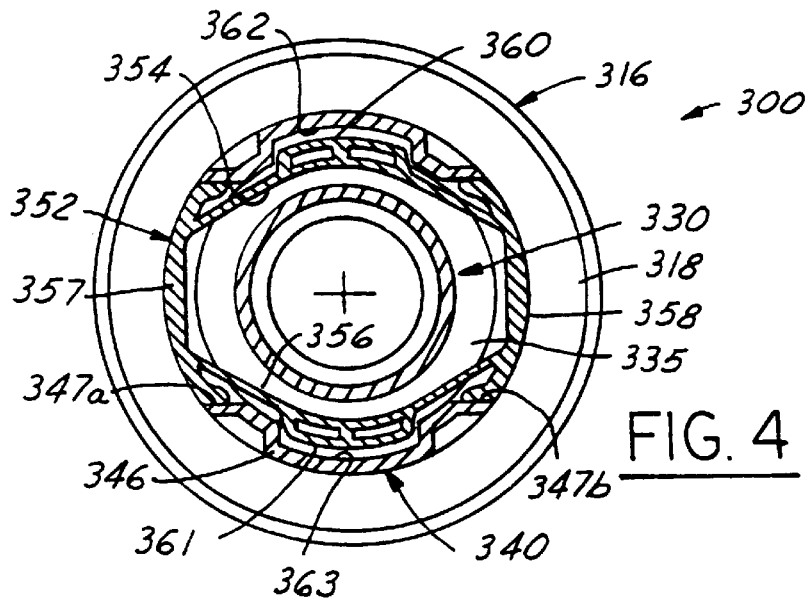
FIGS. 4 and 5 are cross-sectional views taken respectively on lines 4—4 and 5—5 of FIG. 1.
Figure 5:
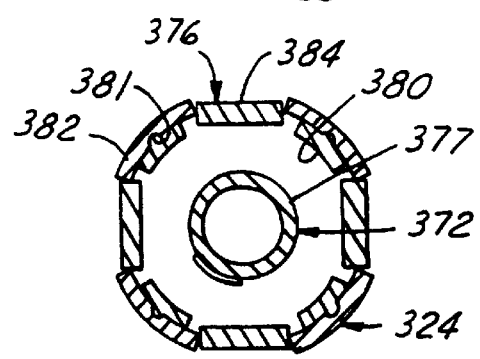
Figure 6:
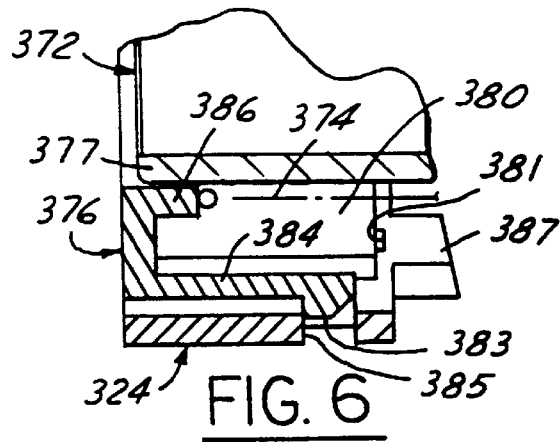
FIG. 6 is a fragmentary enlarged view of the portion of FIG. 2 encompassed by the circle 6 in FIG. 2.

Detachable connection of core 330 to bracket 316 is provided by an annular, flexible locking clip 352 when fully inserted and captured in coupling passageway 347 as shown in FIGS. 2, 3 and 4. Clip 352 has a pair of outwardly bowed resilient spring legs 354 and 356 (FIG. 4) that extend between and are integrally joined to diametrically opposite squeeze ends 357 and 358 of the clip that are dimensioned at their circumferentially opposite ends to fit closely but slidably into the passageway openings 347a and 347b in assembly with connector coupling 340. A detent foot 360, 361 extends radially outwardly from each respective spring leg 354, 356 midway between the clip ends 357 and 358.

Clip 352, connector coupling 340, core 330 as well as valve housing 324 preferably are made of the same fuel absorption and creep resistant composition as the anchor sleeve portion 322 of housing 324, e.g., acetate material. When clip 352 is constructed to the engineering scale shown in FIGS. 2, 3 and 4, as well as FIG. 16, the acetate material of legs 354 and 356 is flexible and resilient so that the legs can be deflected toward one another as they are slidably squeeze-cammed during insertion into the confines of passageway 347. A pair of diametrically opposed detent pockets 362 and 363 provided in skirt wall 346 internally thereof respectively loosely receive detent feet 360 and 361 as clip 352 springs back to free-state condition to thereby provide assembly retention of clip 352 as shown in FIGS. 3 and 4.

In the manufacture and assembly of the fuel pipe/fuel tank quick-connection arrangement 300 in accordance with the first embodiment method of the invention, valve housing 324 and connector coupling 340 are also preferably injected molded of the aforementioned acetate material and as separate parts. The subassembly of valve housing 324 and connector coupling 340 with base 318 to form bracket 316 as shown in FIG. 7 is preferably made by positioning valve housing 324 and connector coupling 340 as inserts in a suitable mold cavity configured for overmolding base 318 from high density polyethylene material injected therein with components 324 and 340 held fixed as inserts in the mold cavity. The HDPE material of base 318 flows through the annular row of openings 323a in anchor sleeve flange 323 and likewise through openings 343 of connector coupling flange 342 while engulfing these flanges as shown in FIGS. 2, 3 and 7. The HDPE material for forming base sleeve 320 also flows between flanges 323 and 342 and radially inward of anchor sleeve 322 and forms the sealing sleeve 320 concentrically within the confines of anchor sleeve 322 of the valve housing 324.

Figure 16:
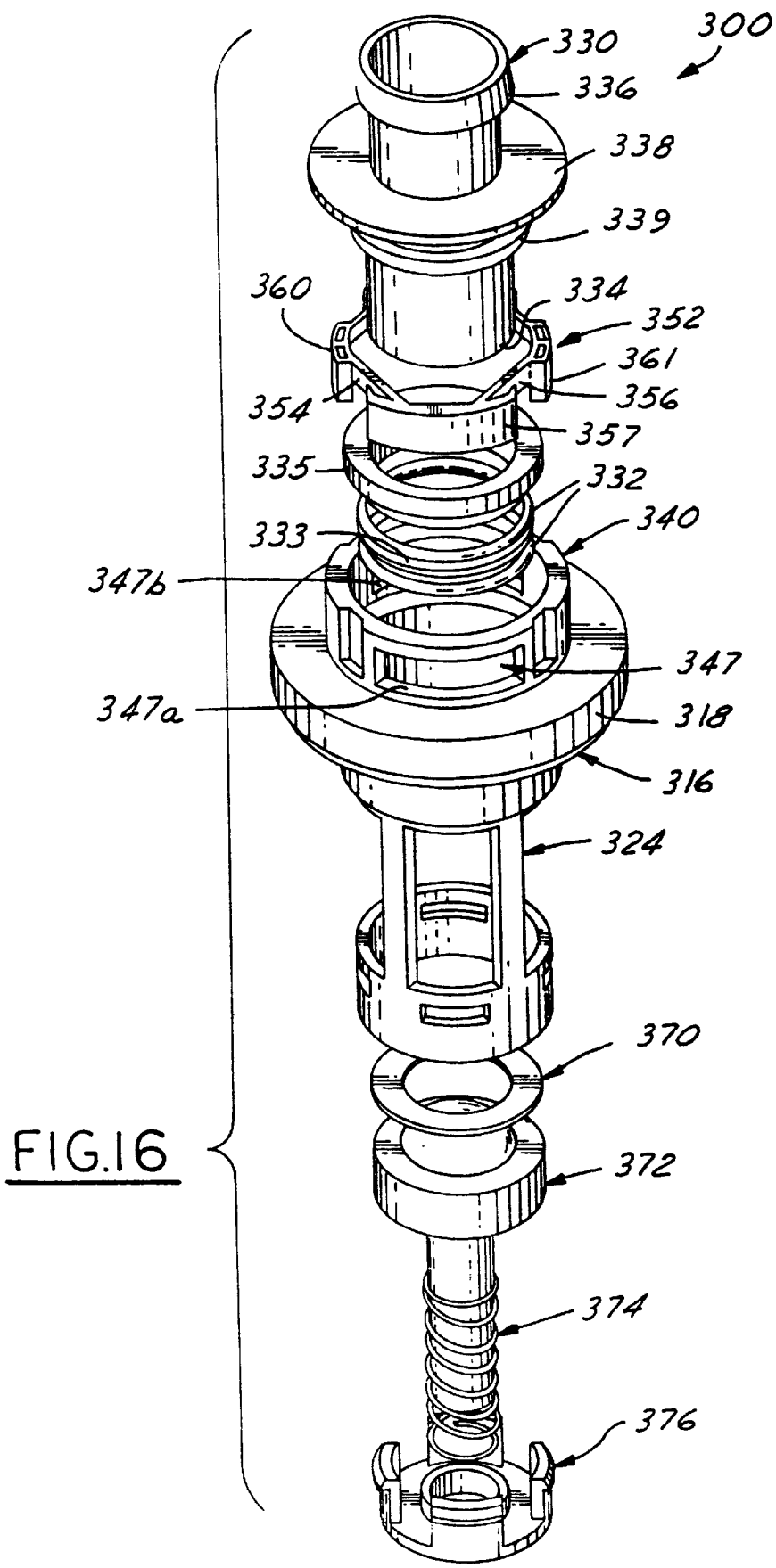
FIG. 16 is an exploded perspective view of the connector arrangement of the first embodiment illustrated in FIGS. 1–15.
Figure 17:
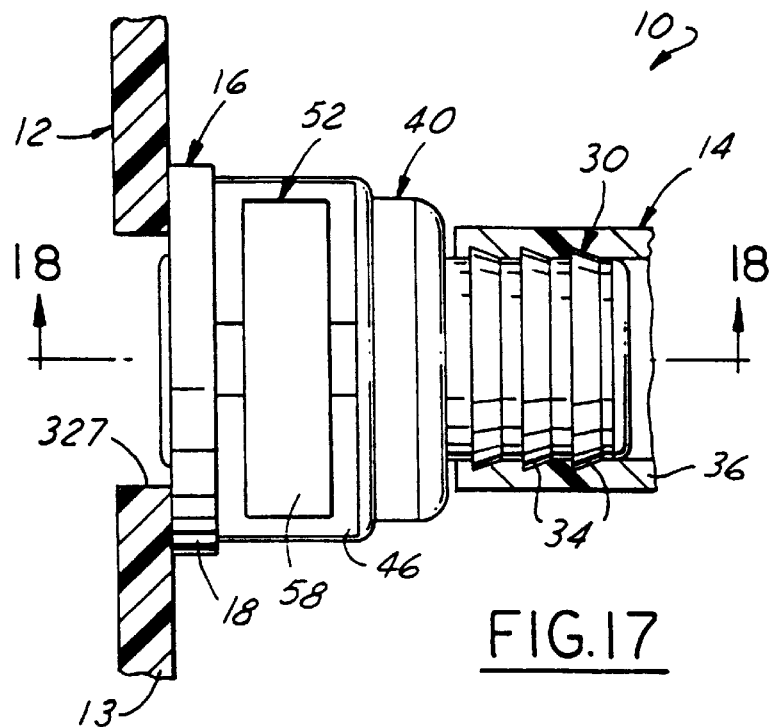
FIG. 17 is a partially sectioned elevational view of a fuel tank/fill pipe connection arrangement in accordance with a second embodiment of the invention.

The remaining components that make up the check valve assembly are then assembled into valve housing 324. As best seen in FIG. 16, these components comprise a sealing ring disk 370, a domed-mushroom-shaped valve member 372, a compression coil spring 374 and a combined spring keeper and valve member bushing support clip 376. These components of the check valve subassembly are described in more detail hereinafter with respect to their structure, function and mode of operation in the connector arrangement 300.

In further assembly of connector arrangement 300, the pair of O-rings 332 are installed within base sleeve 320, with spacer ring 333 interposed therebetween, and then locking ring 335 inserted into the outer end of sleeve 320. Latching clip 352 is then inserted endwise into passageway 347 of connector coupling 340 to its installed, free-state position shown in FIG. 4. This also locks ring 335 axially in position, as explained in more detail thereinafter.

The bracket/valve housing subassembly 316, 324 of embodiment 300 is then ready for tank installation. The assembly is inserted valve-housing-first through the tank wall opening 327 to bring base 318 into abutment with tank wall 327. Base 318 of bracket 316 is then firmly and sealably secured to tank wall 327 in the zone surrounding the tank fill opening 327, again by thermoplastic welding or other suitable means of adhesion and sealing.

Outlet end 36 of fill pipe 14 is then secured over the free end of core 330 as shown in FIG. 2 and secured sealably thereto with a suitable hose clamp 337.

More particularly, the coupling retaining latch clip 352 is assembled to connector 340 by pushing the same endwise into and through passageway 347 until the same is yieldably seated in assembly as shown in FIG. 4. Assuming that clip 352 is inserted from right to left as viewed in FIG. 4, with end 357 being the leading end, the leading end will slide through opening 347b. As the inclined portions of resilient legs 354 and 356 engage the outer edges of opening 347b, they are yieldably cammed toward one another to permit further entry of clip 352 into passageway 347. When the inclined leading edges of the detent feet 360 and 361 likewise strike the edges of opening 347b, the clip is further squeeze-cammed to force the feet 360, 361 toward one another to permit passage of the same into and through opening 347b. Once the clip 352 has reached the position shown in FIG. 4, the resilience of the legs 354, 356 will cause the detent feet 360 and 361 to snap loosely into the associated pockets 362 and 363 as the clip returns to the free state condition shown in FIG. 4. It thus will be noted that, although ends 357 and 358 fit with a sliding snug clearance in the respective openings 347a and 347b, there is a radial clearance between the outer surface of the legs 354, 356, and likewise as to associated feet 360 and 361 of the clip, with the associated bounding surfaces of the collar connector 340 and pockets 362 and 363. This radial clearance is sufficient so that the legs of the clip can be bowed further apart either by applying clip-releasing squeeze pressure to the opposite ends 357 and 358 of the clip, and also during cam-apart expansion of these portions of the clip as the camming and locking flange 339 of core 330 is forced therethrough during insertion of the core into final quick-coupling assembly in and latch locked position of FIGS. 2 and 3. When locking flange 339 is passed through the cooperative legs 354 and 356 of clip 352 to reach the position of FIGS. 2 and 3, the resilience of the legs causes the same to snap back to the free state condition of the clip shown in FIG. 4 wherein legs 354 and 356 are positioned in radially overlapping relation with the locking flange 339 to thereby securely but releasably hold core 330 from retrograde motion relative to bracket 316.

To complete the fuel pipe to fuel tank connection, the assembly of core 330 and pipe 40 is axially fitted into the assembly of bracket 316 and valve housing 324, with core 330 being axially received with a sliding clearance within lock ring 335, and then sealably and slidably received with a compression interference fit through the pair of O-rings 332 until core end 331 abuts shoulder 334 as shown in FIGS. 2 and 3. Preferably the end face of end portion 331 of core 330 is beveled on the outer edge to facilitate insertion through and compression of O-rings 332 during insertion of core 330 to avoid damaging, twisting or rolling of the O-rings during this procedure.

To remove core 330 and associated fuel pipe 14 from coupling bracket 316 for maintenance and repair purposes, the opposed ends 357 and 358 of clip 352, which are exposed exteriorly of coupling connector 340, are manually squeezed together sufficiently to bow legs 354 and 356 further apart from this position shown in FIG. 4 until feet 360 and 361 are fully bottomed in the associated receiving pockets 362 and 363. This distortion of oval clip 352 towards more rounded condition opens up the interference overlap of the clip legs with the locking flange 339 so that the latter can pass axially therethrough in the retrograde disconnect direction while pipe 14 is pulled axially away from bracket 316 and squeeze pressure is maintained on clip 352. Once locking flange 339 is clear of the clip, core 330 may be completely pulled out from bracket 316 to complete the disconnection procedure. It will be noted that both during this quick-disconnect procedure and thereafter, fuel cannot leak from the tank due to the check valve being in closed condition and the same remaining operable in the tank by integration with bracket 316.

It will also be noted that, in the assembled condition of the first embodiment quick-connect arrangement 300 of the present invention, O-rings 332 seal against he HDPE material of base sealing flange 320 of bracket 316, which is of the same polyethylene base composition as that from which fuel tank 12 is made. The remaining quick-coupling connector components 324 and 330, being made of acetate or other highly stable composition, provide dimensional stability to the coupling sealing interface for enhanced reliability in sealing.

Referring once again to the check valve assembly, the components thereof are preassembled in housing 324 prior to installation of bracket 316 into the fuel tank fill opening 327. This preassembly procedure is simple and straightforward. The valve member 372 is an injection molded part with an enlarged head portion 373 having a domed end face 375 that carries in an external groove the seal disk ring 370. The stem 377 of valve member 372 is hollow and extends substantially coaxially with housing 324 in the open and closed conditions of the valve. To assemble the check valve components, check valve member 372 is slidably inserted head first into housing 324 to bring seal 370 into abutment with sealing surface 326 of the housing. Then coil spring 374 is slidably telescoped onto stem 377 and extends substantially the full distance axially of the same in its free state condition. Then the bushing/spring keeper clip 376 is inserted open end first into the open rear end of housing 324 with each of its orienting ribs 379 of its four mounting legs 380 aligned or registered with associated grooves 381 of an associated circumferential wall 382 provided at the tank-interior end of housing 324. When each of the beveled end tangs 383 of the four spring legs 384 of bushing 376 engage the outer end of the associated wall 382, they are resiliently cammed towards one another to permit entry thereof into the interior of wall 382. Once tangs 383 register with associated with slot openings 385 in wall 382, they spring out and lock the bushing clip 376 in place in housing 324.

As bushing clip 376 approaches the final snap lock position of FIGS. 2 and 3, an internal bushing flange 386 slides onto the adjacent end of valve member stem 377. Once bushing clip 376 is fully installed, it will have slightly compressed spring 374 so that the spring exerts a light valve-closing biasing force on valve member 372. It will be seen that the valve member 372 is thus slidably supported by the hollow stem 377 sliding within bushing flange 386 during opening and closing motion of the valve member, and likewise by the cylindrical external surface of valve end 373 sliding along the four legs 387 of valve housing 324.

Once the fuel pipe to fuel tank connection has been made as described previously, the operation of the check valve mechanism is as follows. Assuming fuel having been delivered to the quick-connect/check valve assembly via fuel pipe 14, the fuel exerts a valve-opening force on the dome face of check valve member 372. Once this force exceeds the closing bias of spring 374, valve member 372 moves axially into the opening direction (to the left as viewed in FIGS. 2 and 3), thereby opening a flow gap for the fuel and allowing it to pass around the head of check valve 372 and exit the valve housing 324 via the four large windows defined between the four legs 387 of the housing. Axial opening movement of valve member 372 also compresses spring 374, thereby storing energy in the spring to be used in closing the valve when the flow of fuel stops. When this flow does eventually stop (at the end of refueling or interruption of refueling), this stored energy pushes the valve member 372 back to original closed position, and the preload of spring 374 created during assembly moves the valve seal 370 tight against the valve seat 326 of valve housing 324. Sealing in this way prevents any fuel which may still be under pressure in the fuel tank after shut-off from escaping back up the fill pipe, thereby effectively stopping any back flow of fuel as well as momentary spit back effects.

It will also be understood from the foregoing construction of the first embodiment 300 that the check valve components 370–376, by being integrated into the connector mounting bracket 316 by way of their mounting on valve housing 324, provides a completely operable check valve as an integrated sub-assembly with coupling bracket 316 and hence is automatically installed in final tank-assembled position during the operation of mounting and welding the bracket 316 to the exterior surface of tank wall 13. Moreover, the addition of the back flow check valve components to assembly 300 does not interfere with or otherwise alter the assembly procedure of the remaining fuel line connector components of assembly 300 as described hereinabove. In addition to preventing well-back or spit-back at the vehicle gas cap opening, check valve 372 also prevents the fuel content of the tank from leaking out of the tank, and hence from leaking out from the fuel pipe flow path upstream of connector core 330, as might occur should a leak develop in the pipe or hose 14 or other components of the upstream fuel supply pipe system.

It will also be seen that the first embodiment 300 of the fuel fill pipe/fuel tank connecting arrangement, in addition to providing an economical and reliable quick-connect coupling, provides thermoplastic weld sealing of the quick-connect structure directly to the fuel tank polyethylene material through the use of an overmold base 318 of like material, which in turn acts to retain both the quick-connect clip connector coupling 340 and the check valve housing 324, as well as forming one side of the sealing surface for the tank coupling connection. Base 318 has an integral cylindrical sleeve 320 of overmold material (e.g., HDPE) which forms a sealing face of material that is identical to the fuel tank material. Yet O-ring seals 332 are reliably held in radial compression in assembly with anchor sleeve 320 due to being sandwiched between the reinforcing anchor sleeve 322 and core 330 that are made of acetate material. The locking ring 35 that axially retains the O-rings in their assembled location preferably is held in place solely by the retaining clip 352 in assembly with the connector coupling 340. The one-way camming engagement of the locking flange 339 with retaining clip 352 during insertion of fuel pipe core 330 renders the coupling hook-up fast, reliable and efficient. This mechanical lock acts to hold the sealing interface and quick connect coupling together so that it cannot be removed or disconnected unless clip 352 is intentionally manually displaced by a coordinated two-handed operation, namely squeezing of both clip ends towards one another simultaneously while concurrently pulling on pipe 14 in a disconnect direction and thereby allowing the core 330 to move back out of the connection.

By thus using the overmolding process in sealing the pipe fuel path interface to the fuel tank material, no leakage path is allowed. By contrast, prior attempts to quick-connect to a fuel tank have attempted to seal the pipe interface directly to the material used for the clip housing, which is different from the tank material, i.e., acetal material or acetate versus a polyethylene base material such as HDPE. This difference in material is necessary because the fuel tank material, being polyethylene based composition, is of a nature that does not lend itself to mechanical locking. However, in accordance with the embodiments of the invention, the fuel tank material is effectively locked between the surrounding acetate material of the fitting or check valve structure and that of the fuel pipe core, which are themselves constructed of material such as acetal or acetate type materials which are both stronger in nature than the fuel tank material and not subject to fuel absorption swelling and/or creep effects. This "sandwich" thus prevents the fuel tank material from deforming in a way which would allow fuel to escape past the O-ring seals.

A second advantage of the arrangement of embodiment 300 is the disposition of the sealing package effectively inside the fuel tank. This presents a number of benefits. By doing so, the sealing package is moved away from the exterior of the fuel tank, an environment that is more hazardous than inside of the tank. The exterior of the tank is subject to road surface temperatures, and hence if the seals are located outside fuel tank, they also would tend to absorb heat radiating from the road surface. This absorbed heat tends to break down and change the properties of the plastic components surrounding the seals, tending to make them more likely to allow fuel to leak past the seals. In addition, disposing the O-ring seals inside or substantially flush or co-planar with the tank wall also protects the sealing package from being directly hit by the underbody components during an impact situation, therefore making the assembly more crash safe.

Second Embodiment

FIGS. 17–21 of the drawings illustrate a second embodiment arrangement or assembly 10 also in accordance with the present invention for making exterior connection between polyethylene-based fuel tank 12 and fill pipe 14 of plastic, rubber or other suitable composition. Connector arrangement 10 includes a mounting bracket 16 formed of a flat annular base 18, from the interior diameter of which a circumferentially continuous sleeve 20 coaxially and integrally extends. A circumferentially continuous anchor 22 is closely received over and surrounds sleeve 20 in axially abutment with base 18 of bracket 16. A pair of axially spaced ribs 24, 26 extend radially outwardly from anchor sleeve 20 to define a circumferential channel 28 therebetween. Ribs 24, 26 are circumferentially continuous, and thereby provide additional hoop strength to anchor 22 in close surrounding engagement with sleeve 20 of bracket 16. Whereas bracket 16 is of high density polyethylene composition similar to that of fuel tank 12, anchor 22 is of a composition such as acetate that is highly resistant to fuel absorption and creep. Thus, the circumferentially continuous geometry of anchor 22, coupled with the additional hoop strength provided by ribs 24, 26, strengthen and restrain sleeve 20 of bracket 16 against geometric changes due to fuel absorption or creep. A hollow tubular core 30 extends through the inside diameter of bracket 16 and projects axially outwardly therefrom. Within sleeve 20 of bracket 16, core 30 has a pair of axially spaced circumferentially continuous channels, within which a pair of annular resilient O-rings 32 are disposed O-rings 32 are radially compressed in assembly by sealing engagement with the inner diameter of sleeve 20 of bracket 16. The portion of core 30 that extends axially outwardly from bracket 16 has an array of outer barbs 34 for telescopically receiving and retaining the outlet end 36 of the plastic or rubber fill pipe 14.

A hollow generally cup-shaped coupling 40 has a base 42 with a central aperture or opening 44 that is closely received over and affixed to the outer diameter of core 30 between barbs 34 and the channels that contain O-rings 32. A circumferential wall or skirt 46 of cup-shaped coupling 40 extends axially and circumferentially around anchor 22, embracing ribs 24, 26 and axially abutting the opposing face of bracket base 18. Wall 46 of coupling 40 has a pair of diametrically spaced parallel linear tangential passages 48, 50 that align in assembly with channel 28 on anchor 22 between ribs 24, 26. The outer ends of passages 48, 50 define rectangular openings 48a, 50a. A clip 52 has a pair of spaced parallel legs 54, 56 that extend from opposed ends of a clip base 58. A foot 60, 61 extends outwardly from each respective leg 54, 56 at an end thereof remote from clip base 58. Clip 52, coupling 40 and core 30 preferably are of the same absorption and creep resistant composition as anchor 22-e.g., acetate. A pair of openings 68, 70 in wall 46 are tangentially aligned with passages 48, 50 and are spaced therefrom across the diameter of coupling 40. A second pair of openings 64, 66 extend radially outwardly from the ends of passages 48, 50 within coupling 40. Passages 48, 50 are positioned in skirt 46 so as to be radially aligned in assembly with and overlie channel 28 in anchor 22.

Figure 18:
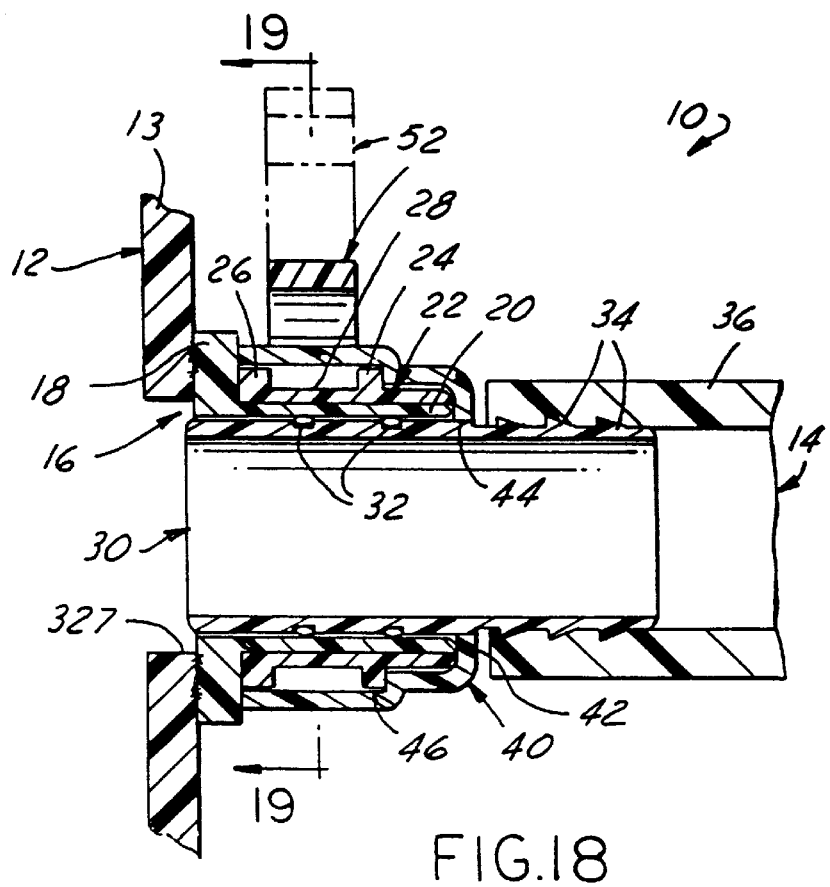
FIG. 18 is a sectional view taken substantially on the line 18—18 in FIG. 17.
Figure 19:
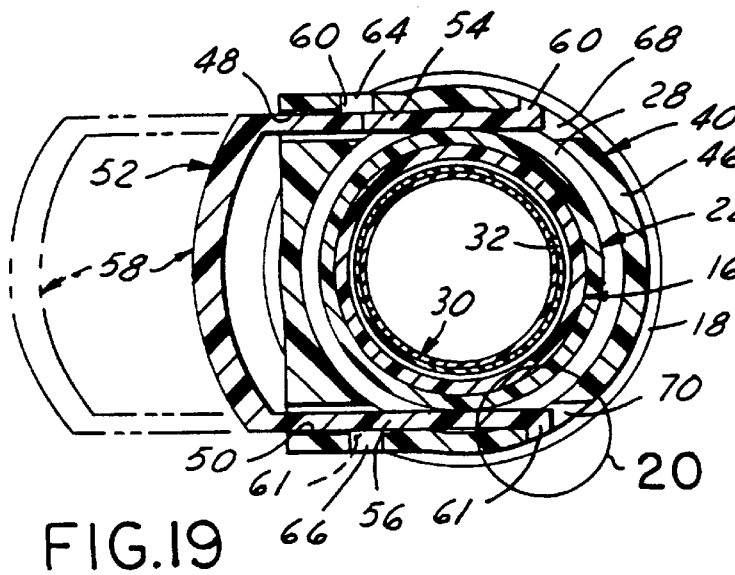
FIG. 19 is a sectional view taken substantially on the line 19—19 in FIG. 18.
Figure 20:
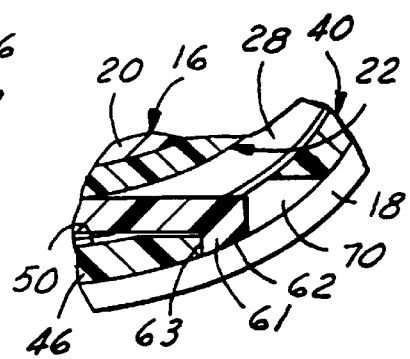
FIG. 20 is a fragmentary view on an enlarged scale of the portion of FIG. 19 within the circle 20.
Figure 21:
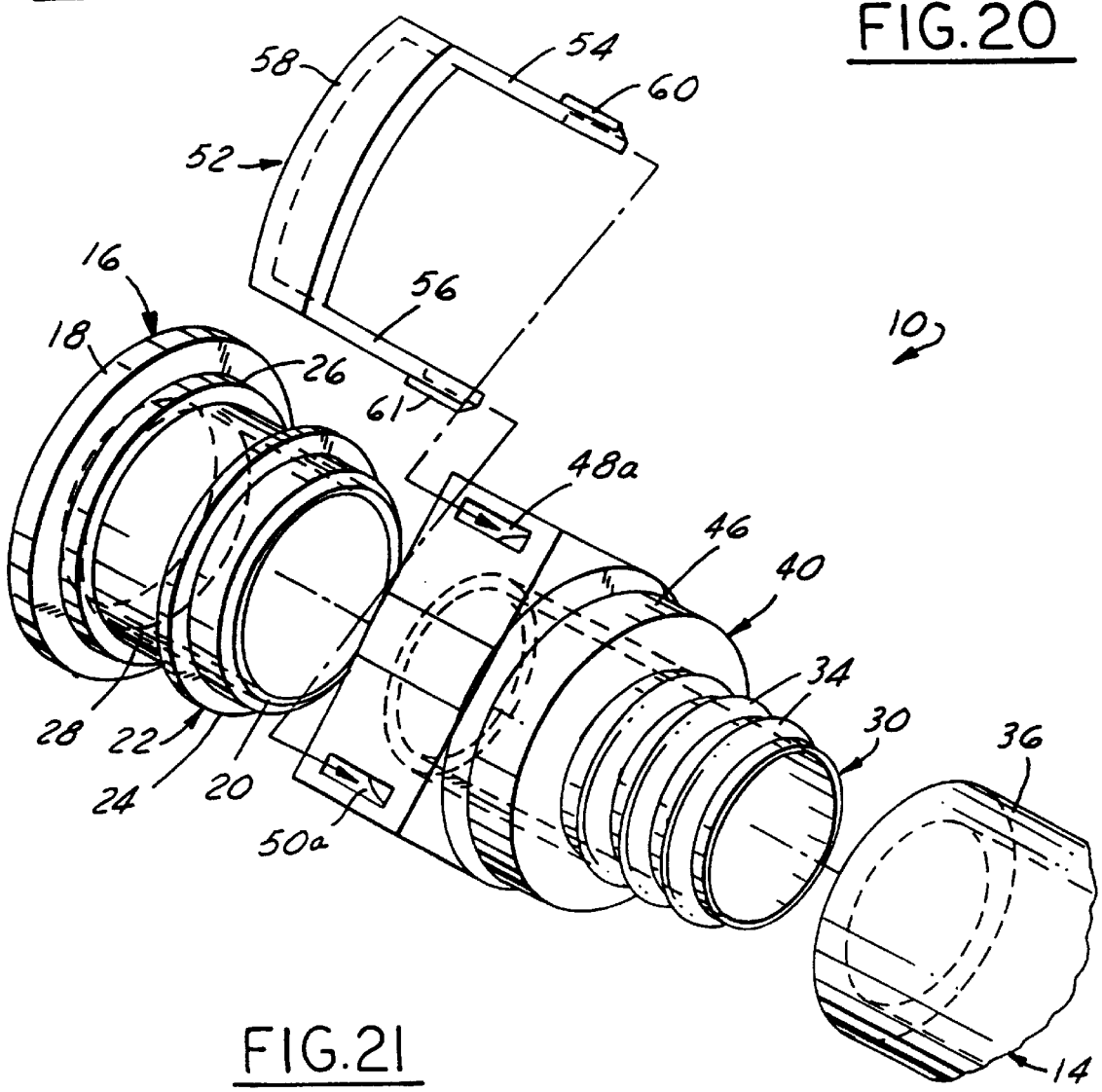
FIG. 21 is an exploded perspective view of the connector arrangement illustrated in FIGS. 17–20.

In assembly, anchor 22 is axially fitted over sleeve 20 of bracket 16 and firmly secured thereto as by thermoplastic welding or other suitable means of adhesion. Base 18 of bracket 16 is firmly secured to the wall of gas tank 12 over the tank fill opening, again by thermoplastic welding or other suitable means of adhesion, either prior to or subsequent to securement of anchor 22 over bracket 16. O-rings 32 are placed in corresponding channels within core 30, and coupling 40 is secured to core 30, again by welding or other suitable means of adhesion. Outlet end 36 of pipe 14 is secured over the free end of core 30. The assembly of core 30 and coupling 40 is axially fitted onto the assembly of anchor 40 and bracket 16, with core 30 being axially slidably received within sleeve 20 of bracket 16 and skirt 46 of coupling 40 being axially received over the outer periphery of anchor 22 into abutment with base 18 of bracket 16. The axial end of sleeve 20 is rounded, as best seen in FIG. 18, to facilitate compression of O-rings 32 during insertion of core 30 without damaging, twisting or rolling the O-rings.

Clip 52 is either preassembled to coupling 40, or assembled thereto to this stage. Clip legs 54, 56 are inserted into the open ends 48a, 50a of passages 48, 50 in coupling 40, with the angulated axial faces 62 (FIG. 20) of feet 60, 61 cooperating with the edges of openings 48a, 50a to cam the legs radially inwardly to permit such insertion. At the open position of the clip illustrated in phantom in FIG. 19, feet 60, 61 extend into and are resiliently retained within openings 64, 66 that extend radially outwardly from passages 48, 50 respectively. To secure coupling 40 in position, clip 52 is urged toward the axis of the coupling, so that angulated faces 62 in feet 60, 61 cooperate with the edges of openings 64, 66 so as to cam the leg ends inwardly and permit the same to slide along the passages 48, 50 respectively. The legs are thus received within channel 28 of anchor 22, until feet 60, 61 register with openings 68, 70, at which point feet 60, 61 snap radially outwardly so as to engage openings 68, 70 to prevent inadvertent removal of clip 52. Clip 52, which thus extends through passages 48, 50 in coupling 40 and through channel 28 in anchor 22, firmly locks coupling 40 and core 30 to anchor 22, bracket 16 and fuel tank 12.

To remove the coupling and core from the anchor and bracket for maintenance and repair purposes, feet 60, 61 on clip 52 are urged laterally inwardly toward each other while clip 52 is pulled outwardly from the coupling. When feet 60, 61 clear the opposing edges of openings 68, 70, clip 52 may be withdrawn to the position illustrated in phantom in FIG. 19, at which point feet 60, 61 register with openings 64, 66 to lock clip 52 in the open position. Coupling 40 and core 30 may then be axially withdrawn from anchor 22 and bracket 16. Feet 60, 61 have flat faces 63 (FIG. 20) perpendicular to the longitudinal dimension of legs 54, 56. Faces 63 cooperate with the opposing edges of opening pairs 68, 70 and 64, 66 to lock clip 52 against withdrawal from coupling 40.

It will be noted that, in assembled condition of the second embodiment quick-connect arrangement 10 of the present invention, O-rings 32 seal against sleeve 20 of bracket 16, which is of the same polyethylene-based composition as is fuel tank 12. The remaining connector components, being made of acetate or other highly stable composition, provide dimensional stability to the connector arrangement for enhanced reliability and sealing.

Third Embodiment

Figure 22:
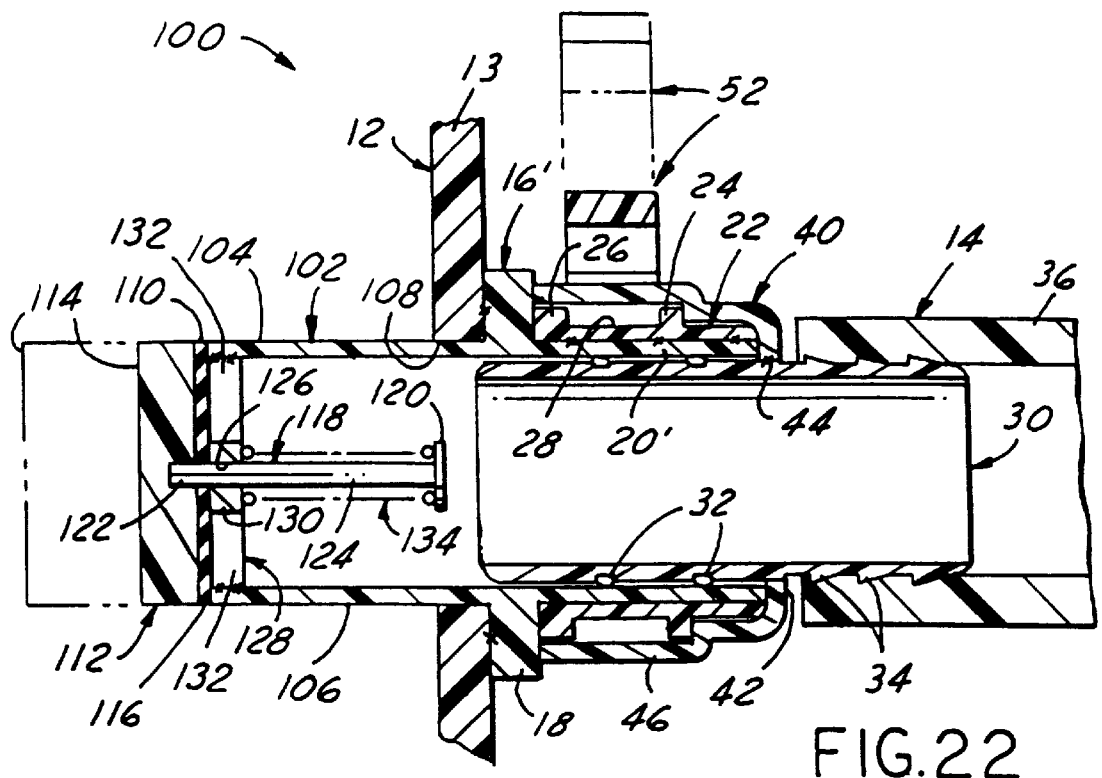
FIG. 22 is a sectional view taken along the longitudinal center line of a third embodiment of a fuel tank/fill pipe connection arrangement incorporating a check valve in accordance with the present invention.

Referring to FIG. 22, the third embodiment also comprises a novel quick-connect and check valve assembly 100 for making exterior fuel fill connections between plastic based fuel tank 12 and fill pipe 14 of plastic, rubber or other suitable composition. Those components of assembly 100 that are identical to assembly 10 of the aforesaid second embodiment 10 are given identical reference numerals, and those components alike in function and structure are given the same reference numerals raised by a prime suffix, and the detailed description of such components is not repeated.

Mounting bracket 16' of connection assembly 100 is a modified form of bracket 16 wherein, in accordance with the present invention, a tubular inlet protuberance is preferably integrally formed with flange 18 of bracket 16' as a coaxial extension of sleeve 20 of bracket 16' so as to form a fill spout 102 that protrudes into the interior of tank 12. Spout 102 has a cylindrical inner surface 104 with the same I.D. as sleeve 20' and forming a smooth continuation of its inner surface. The outer peripheral surface 106 of spout 102 preferably has a configuration complemental to that of the mounting access opening 108 in the wall of tank 12, both preferably being cylindrical, and spout surface 106 preferably has a snug slip fit through opening 108. The free end surface of spout 102 is preferably planar in a plane perpendicular to the spout axis and has a finished surface suitable to function as an annular leak tight valve seat 110.

A back flow check valve member 112 is movably supported on spout 102 and is cooperable with valve seat 110 for opening and closing fuel flow communications between the spout interior and the tank interior. Valve member 112 preferably comprises a spout cap 114 in the form of a cylindrical disk made of plastic material, such as a polyethylene-based material, and preferably having an O.D. matching that of spout 102. Valve member 112 also includes a relatively thin disk seal 116 suitably affixed to the surface of cap 114 facing seat 110 and is adapted to sealably engage seat 110 in the closed condition of the valve in a liquid-tight manner. Valve member 112 is supported by a valve post 118 for axial motion between its spout closing position, shown in solid lines in FIG. 22, and a range of progressively more open positions, shown in phantom in FIG. 22.

Valve post 118 has an enlarged, spring keeper head portion 120 at its free end and its axially opposite end 122 is embedded in and suitably affixed to cap 114. The stem portion 124 of post 118 is cylindrical and slidably guided in a bore 126 of a support web 128 mounted within the outlet end of spout 102. Support web 128 preferably comprises two cross arms 130, 132 arranged perpendicular to one another and extending diametrically across the interior of spout 102 flush with valve seat 110 and with their ends suitably affixed to the spout inner surface 104. The four quarter-circular spaces defined between cross arms 130 and 132 provide tank-fill fluid flow openings that communicate the interior of spout 102 with the tank interior when valve 112 is open. Valve 112 is normally lightly biased closed by a compression coil spring 134 sleeved over post stem portion 124 and abutted at its axially opposite ends against keeper head 120 and the web hub portion formed at the intersection of web cross arms 130 and 132.

In the manufacture of connector/valve assembly 100, bracket 16' is molded with spout 102 integral with flange 18, whereas check valve components 112–134 may be separately manufactured and assembled as a sub-assembly for insertion into the outlet end of spout 102 as shown in FIG. 22. Cross arms 130 and 132 may be dimensioned to have slip press fit with the surface 104 of extension 102 and then be suitably affixed thereto as by sonic welding. All the components of check valve 112 are preferably made of fuel-resistant plastic material (e.g., acetate), including spring 134, although spring 134 alternatively may be made of stainless steel, if desired. Preferably, post 118 and cross arms 130, 132 are also made of acetate or other plastic material composition highly stable against fuel swelling and load creep to preserve the free sliding fit of the post stem 124 in hub bore 126 of the support arms. Disk seal 116 preferably is made of a conventional rubberized fabric material suitably adhesively or mechanically bonded to cap 114.

With the foregoing construction of the connector/check valve embodiment 100, it will be seen that the check valve components 110–134 can be integrated into the connector mounting bracket 16' by way of their mounting on spout 102 to thereby provide a completely operable check valve as an integrated sub-assembly with bracket 16' that is automatically installed in final tank-assembled position during the operation of mounting bracket 16' to the exterior wall surface of tank 12. Moreover, the addition of the back flow check valve components to assembly 100 does not interfere or otherwise alter the assembly procedure of the remaining fuel line connector components of assembly 100 as described in the aforesaid second embodiment 10.

In operation of assembly 100 during a vehicle fueling operation, the initial flow of liquid fuel via fuel hose 36 into core 30 rapidly creates sufficient hydraulic force, as generated by fuel pump pressure and/or gravity head, to push cap 114 from closed toward full open position against the yieldable resistance exerted by spring 134 so that fuel can flow into the interior of tank 12 with only minimum restriction or resistance from the check valve member 112. If and when the force created by the pressure of the incoming fuel fed into tube 36 drops below the preload biasing force of spring 134, it forces valve 112 into closed position, thereby effectively shutting off fuel flow in the reverse direction from the tank interior into spout 102. Valve closure will also be so effected when the hydrostatic force of fuel in the tank interior acting in a closing direction on valve 112 exceeds the oppositely of acting forces, if any, of fuel in the fuel pipe line 14, i.e., valve 112 thus acting as a conventional one way check valve for the fuel fill flow path into the tank to thereby prevent well-back or spit-back at the vehicle gas cap opening.

Thus, in addition to the dimensional stability advantages of connector assemblies 300 and 10 of the aforesaid respective first and second embodiments 300 and 10, connector assembly 100, like assembly 300, offers the further advantage of providing an economical and efficient fill back flow check valve operation without thereby adding to the expense of installing the quick-connect fuel fill pipe-to-tank installation.

In addition, connector/check valve assembly 100 provides the further advantage of preventing leakage of fuel from the tank past O-ring seals 32 in the event of damage, failure or deterioration of these O-rings. Valve member 112 also isolates O-rings 32 from the effects being continuously exposed to the hydrostatic pressure of fuel in tank 12, which might otherwise accelerate leakage past these O-rings as their ability to seal against a given maximum pressure is reduced during their service life.

Of course, check valve 112 also prevents fuel content of the tank from leaking out from the fill pipe flow path upstream of connector core 30, as might occur should a leak develop in hose 36 or other components of the upstream fuel flow fill pipe system.

Fourth Embodiment

Figure 23:
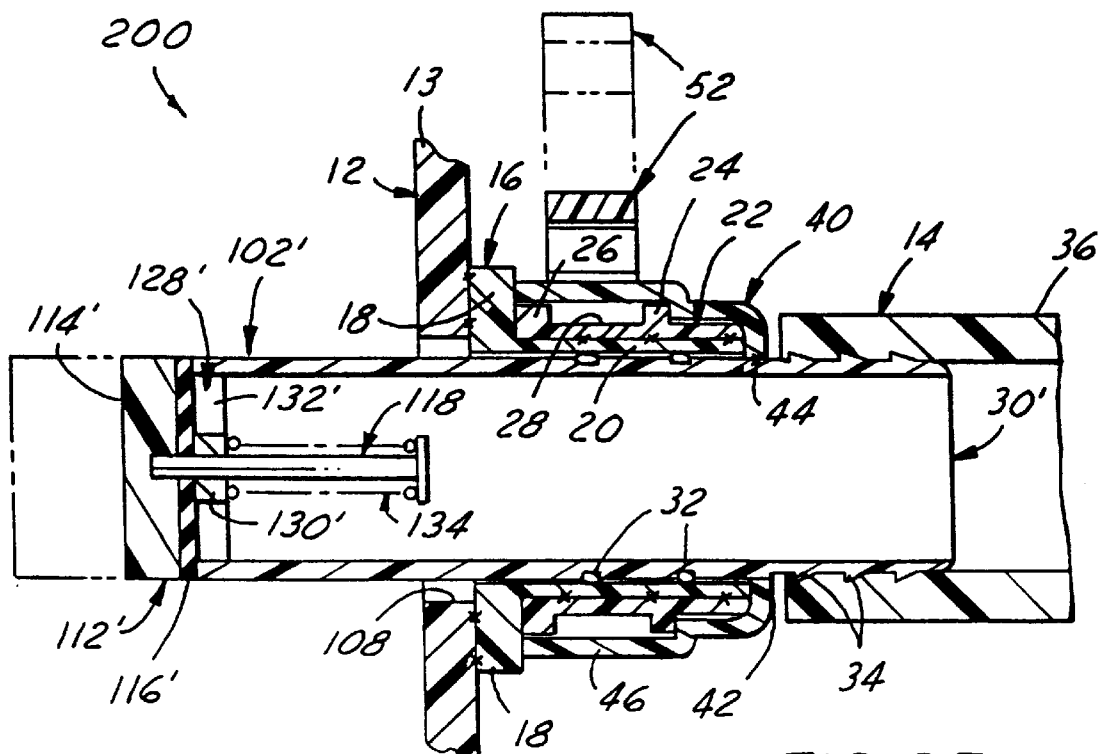
FIG. 23 is a sectional view taken along the longitudinal center line of a fourth embodiment of a fuel tank/fill pipe connection arrangement incorporating a check valve also in accordance with the present invention.

FIG. 23 illustrates a fourth embodiment of a combination of a fuel fill pipe/fuel tank quick connection assembly with an integrated back flow check valve also in accordance with the present invention. Again, the tank/fuel fill pipe quick connect components identical to those described in the aforesaid second embodiment 10 are given the same reference numeral, and components alike in structure and/or function are given the same reference raised by a prime suffix, and the description of such components not repeated.

Assembly 200 incorporates a back flow check valve member 112' that is constructed and operable in the manner of check valve member 112 except for modifying the diametrical dimensions of cap 114', seal 116' and web support 128' to fit such check valve components to a smaller diameter extension spout 102'. Note that spout 102' in assembly 200 is formed as an integral continuation of the tank-end of core 30 of the second embodiment 100 to thereby form the modified core 30' shown in FIG. 23. Thus, in this embodiment 200, all of the check valve components as well as core 30' are made of the more stable plastic material, namely, acetate or other highly stable composition that is highly resistant to fuel absorption and load creep. As so modified, assembly 200 integrates a check valve operation mode to prevent back flow leakage from the tank contents into the fuel fill path, and hence leakage from fill hose 36 and other upstream components, after installation of the combined fuel line connector and calve valve for use in service.

Although in assembly 200 the O-rings 32 are not isolated from the fuel tank contents or potential pressure head as in the third embodiment 100, assembly 200 does have an after-market advantage over assembly 100, i.e., it is adapted to use in retrofitting tanks equipped with the quick-connect assembly 10 of the aforesaid second embodiment merely by substituting core 30' (with the check valve sub-assembly installed therein) for the core 30 of the prior installation.

However, unlike the third embodiment assembly 100 of FIG. 22, fill pipe 36 and associated core 30' of assembly 200 cannot be disconnected from bracket 16 if tank 12 contains fuel that can spill out of opening 108 and through sleeve 20 of bracket 16. Assembly 100 is thus advantageous over assembly 200 in that it permits disconnection of the fill pipe 36 from the tank while the tank contains fuel that would otherwise spill out of the tank through the wall opening 108.

Fifth Embodiment

FIGS. 24–30 illustrate a fifth embodiment of a fuel fill pipe/fuel tank quick connection assembly with an integrated back flow check valve also in accordance with the present invention. In many respects, the fifth embodiment 400 illustrates the application of the principles of utilizing an overmold mounting base made of fuel tank material, such as HDPE, to mechanically couple a check valve housing to a clip-receiving coupling connector, following principles of the first embodiment 300 described previously as applied to the third embodiment 100 also described previously. Again, those components of assembly 400 that are identical to previously described assemblies are given identical reference numerals, and those components alike in function and structure are given the same reference numerals raised by a prime suffix, and for purposes of brevity, the detailed description thereof is not repeated.

Figure 24:
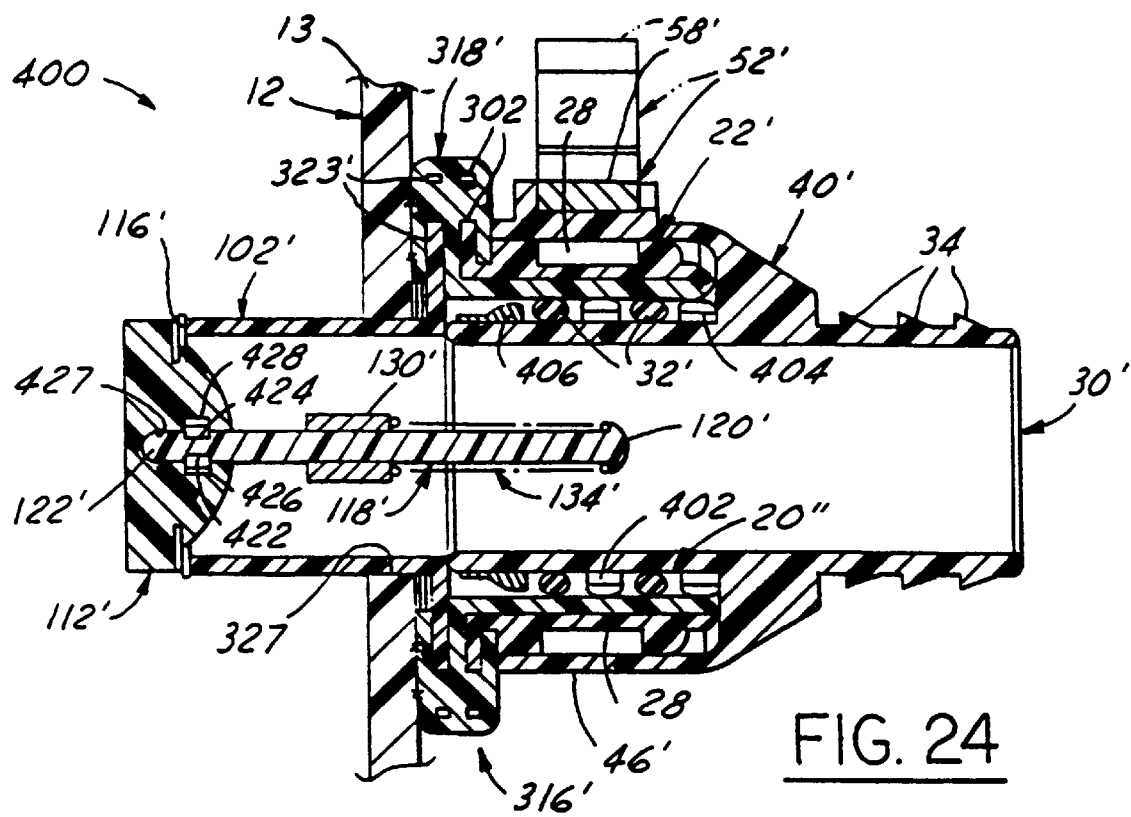
FIG. 24 is a center cross-sectional view taken on the line 24—24 of FIG. 26 illustrating a fifth embodiment of a fuel tank/fill pipe connection arrangement also incorporating a check valve in accordance with the present invention, and utilizing a connector clip of the type employed in the second, third and fourth embodiments of FIGS. 17–23, and further utilizing the overmold bracket base feature of the first embodiment of FIGS. 1–16.
Figure 25:
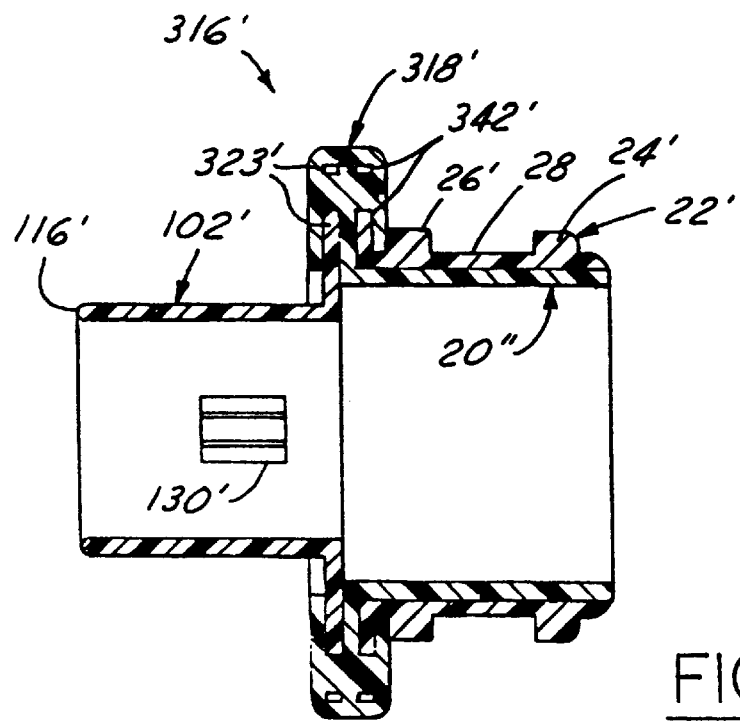
FIG. 25 is a center cross-sectional view of the subassembly of the check valve housing, bracket overmold base and clip-receiving connector component of the connection arrangement of FIG. 24, but shown by itself as a subassembly.
Figure 30:
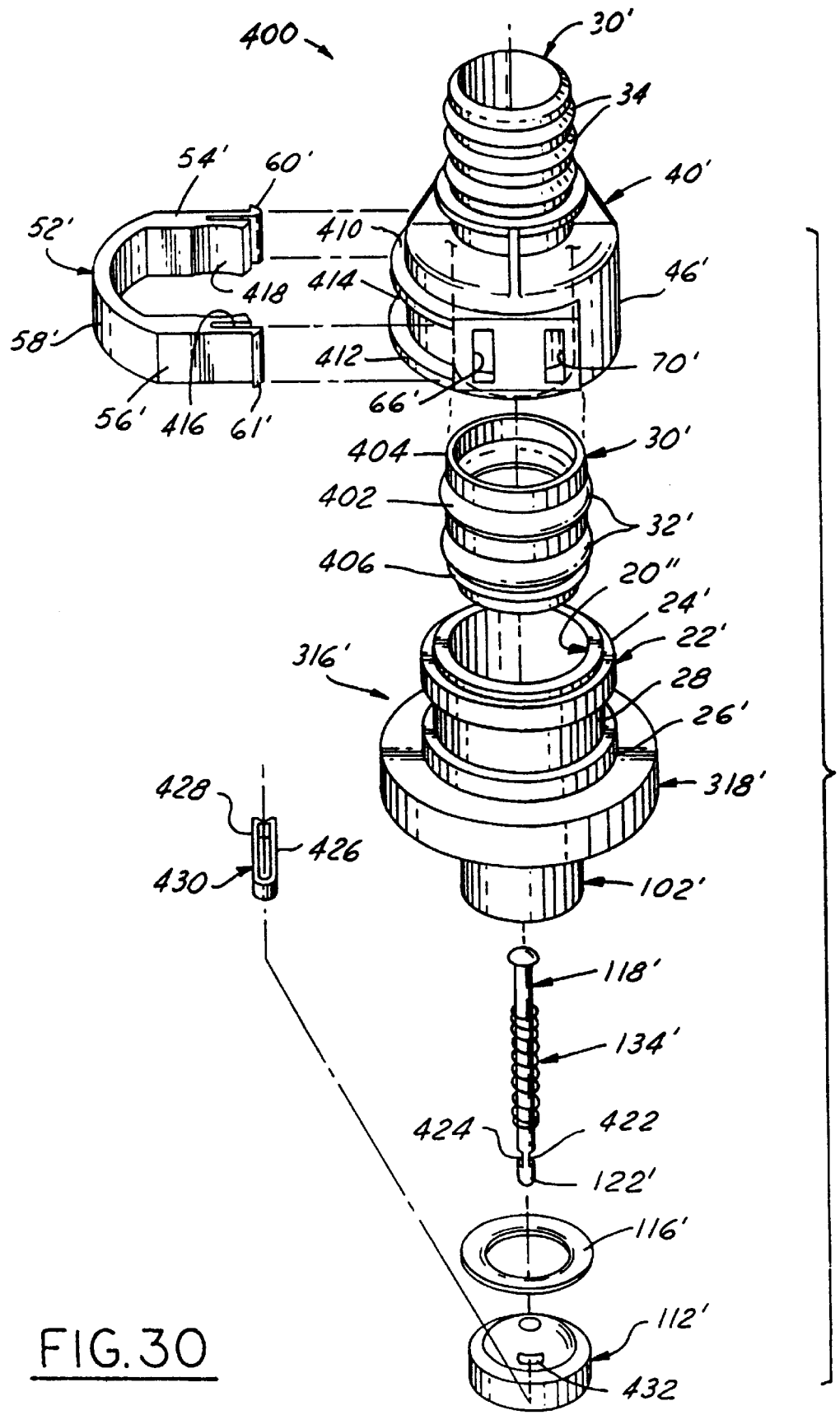
FIG. 30 is an exploded perspective view of the connector arrangement of the fifth embodiment illustrated in FIGS. 24–29.

Among the features incorporated into assembly 400 from previously described embodiments 300, 10, 100 and 200, it will be seen from FIGS. 24 and 25 that anchoring sleeve 22' is provided with an external flange 342' that is perforated with the annular roll of holes and indirectly secured to valve housing 102' (with its corresponding external flange 323' likewise perforated) by both being embedded in the engulfing HDPE material of mounting base 318' that is again formed as an overmold relative to these two separately pre-molded components. As in previous embodiments, mounting base 318' and its outward protruding integral sealing sleeve 20" are made of the same material as tank 12, preferably HDPE, whereas anchoring sleeve 22', valve housing 102', cup-shaped coupling 40' and core 30' are made of fuel-resistant acetate type material.

Note, however, that in embodiment 400, coupling 40' is molded as an integral component with core 30', and that the portion of core 30' confined within the cup-shaped coupling 40' carries a sealing stuffer pack made up of the two O-rings 32' held spaced apart by a spacer ring 402. O-rings 32' are further positioned by another spacer ring 404 (FIGS. 24 and 30) and farther retained axially by a locking ring 406 encircling and affixed to the downstream of core 30'. It is to be understood that in FIG. 30 the downstream portion of core 30' is shown separated and exploded downwardly from the upstream portion of core 30'. As will be evident from FIG. 24, these upstream and downstream portions of core 30' are preferably molded in one piece as an integral unit.

Additional improvements and refinements incorporated into assembly 400 include a modification of the circumferential wall or skirt 46' of cup-shaped coupling 40' by providing a pair of arcuate ribs 410 and 412 (FIG. 30) that define a groove 414 therebetween for nestably receiving the bight base 58' of the coupling locking clip 52' when fully inserted into coupling 40' to thereby releasably couple core 30' and its associated fuel pipe 14 (not shown) to tank 12 (not shown) via mounting bracket 316. Note also that the free ends of legs 54' and 56' of locking clip 52' are each provided with a blind slot 416 (FIG. 28) to enhance their yieldable resilient flexing characteristic and thereby facilitate insertion and release manipulation of the clip as described previously in conjunction with the second embodiment assembly 10. A curved surface 418 is also provided adjacent the free ends of legs 54' and 56' (FIG. 28) to enhance conformability and seating of the leg free ends into the groove 28 in the locked, fully installed and seated condition of clip 52'.

Check valve member 112' is dome shaped similar to the head of valve member 372 of the first embodiment 300. Also a modified valve post 118' is provided with a pair of notches 422 and 424 (FIGS. 24 and 30) that respectively receive the legs 426 and 428 of a flexible clip-type key pin 430 after the downstream end 122' of post 118' is fully seated in a mating bore 428 provided in valve member 112'. Clip key pin 430 is inserted into valve member 112' via a transverse keyway 432 (FIGS. 24 and 30) provided in valve member 112' that perpendicularly intersects the axis of valve post 118. Clip 430 is inserted and then retained in the keyway due to the resilience of its legs enabling its free end tangs to spread apart in the keyway as it rides over the valve post and then to hold the tangs together once in keyed lock-up relation with the valve post in valve member 112'.

From the foregoing previous description of the first, second and third embodiments 300, 10 and 100, as well as from the drawing views of FIGS. 24–30, it will now be apparent that the fifth embodiment assembly 400 provides the advantages of the overmold mounting bracket construction of assembly 300 while being compatible with the type of locking U-shaped clip 52 and connector/anchoring sleeve of the second embodiment 10, although also embodying improvement features thereover. Again it will be seen that the circumferentially continuous geometry of anchor sleeve 22', coupled with the additional hoop strength provided by its ribs 24' and 26', strengthen and restrain the sealing sleeve 20" of overmold base 318' against geometric changes due to fuel absorption and/or creep.

What is claimed is:

1. A quick-connect coupling assembly adapted for connecting a fuel fill pipe to a fuel tank made of a plastic material subject to fuel absorption induced adverse effects of swelling and/or creep under load and having a fill opening formed through a wall of the tank, said assembly comprising a mounting bracket subassembly comprising a base molded of the same type of material as the fuel tank in the form of an annular flange adapted to be sealably affixed to the exterior surface of the tank wall so as to surround the tank fill opening, said base having a cylindrical sleeve extending coaxially from said base flange, a fuel supply conduit coupling comprising a hollow cylindrical coupling core made of fuel-resistant material and having an outlet end adapted to be inserted coaxially and telescopically removably assembled into said base sleeve and having an inlet end adapted to protrude therefrom away from the tank wall and adapted to be sealably coupled to a fuel fill conduit, annular seal means disposed between and slidably engaged with the exterior of said core and an interior surface of said base sleeve when said core and base sleeve are in telescopic assembly, said bracket subassembly further comprising a circumferentially continuous reinforcing member also made of fuel-resistant material and encircling said bracket base sleeve and at least coextensive axially with the region containing said annular seals when said core is assembled in said base sleeve, and a coupling clip adapted for movable interengagement between said conduit coupling and said mounting bracket for releasably retaining said fuel pipe in coupled relation to said fuel tank for fuel flow thereinto via said quick-connect coupling assembly.

2. The coupling assembly of claim 1 wherein said reinforcing member is embedment coupled to said base flange by being initially made as a separate component and then overmolded by the material of said base flange in the molding of said base flange.

3. The coupling assembly of claim 2 wherein a downstream outlet end of said core is operably coupled via said mounting bracket to a fuel fill outlet sleeve adapted to protrude from the tank wall opening into the tank interior, and one way check valve means operably supported by said outlet sleeve for preventing fuel back up into said core from the tank interior.

4. The coupling assembly of claim 3 wherein said reinforcing member is integrally joined at one of its axial ends to an inlet end of said check valve outlet sleeve and at the other of its axial ends as an integral external flange joined to said flange base by overmold embedment in said base flange.

5. The coupling assembly of claim 4 wherein said bracket subassembly further comprises a coupling clip connector encircling said core when in coupling assembly and having an integral external flange joined to said flange base by overmold embedment in said base flange.

6. The coupling assembly of claim 5 wherein said reinforcing member and said core outlet end when disposed in assembly are adapted to protrude through the tank fill opening, and wherein said seals are adapted in assembly to be disposed co-planar with or closely adjacent the tank wall such that said seals are generally sheltered by the tank from adverse external environmental heating effects.

7. The coupling assembly of claim 6 wherein said clip connector has an annular sleeve protruding coaxially from said connector flange in radially outwardly spaced relationship with said core, said core having a circumferentially extending external locking rib registering axially with the interior of said connector sleeve, said connector sleeve having a clip-receiving through-passageway registering axially with said core-locking rib, said coupling clip comprising an annular member held by said connector in said through-passageway and having a pair of resilient legs flanking said core in assembly and being detent cooperable with said locking rib to latch said core in releasable coupled relationship with said bracket subassembly.

8. The coupling assembly of claim 7 wherein said clip has diametrically opposite detent feet, one on each of said legs, and said connector has internal detent pockets for individually detent-receiving said detent feet and to enable detent motion thereof.

9. The coupling assembly of claim 4 wherein said fuel fill outlet sleeve has a valve seat at an inlet end thereof oriented to be disposed interiorly of the tank adjacent the tank fill opening, said sleeve being cylindrical, openly perforate along the side thereof and terminating at an open end axially opposite said inlet end, a snap-in bushing clip removably disposed in said sleeve open end, and wherein said check valve means further include a valve member having a head and slidable within said outlet sleeve and carrying a valve seal engageable with said valve seat, a hollow stem coaxial with said valve head and sidably guided in said bushing clip for valve opening and closing travel, and a valve compression coil spring sleeved on said valve stem and lightly compressed by and between said bushing clip and valve head.

10. The coupling assembly of claim 1 wherein said tank and mounting bracket base and made of a polyethylene-based material, such as HDPE, and said core and said reinforcing member are made of a selected plastic material substantially more highly resistant to adverse effects of the fuel intended for storage in the tank fuel absorption causing or aggravating swelling creep under load and geometric form charge than the polyethylene based material of the fuel tank and bracket base.

11. The coupling assembly of claim 10 wherein said selected plastic material comprises an acetate-based plastic material.

12. The coupling assembly of claim 10 wherein said base sleeve extends coaxially from said base flange toward the inlet end of said core, and wherein said reinforcing member comprises a cylindrical clip-receiving sleeve closely encircling said base sleeve and affixed to said base, said clip-receiving sleeve having a pair of circumferentially continuous ribs providing hoop strength and a guideway for operably receiving said clip therebetween, said coupling further comprising a cup-like outer shell affixed at a narrow end to said core and having its wider open end received telescopically over said clip-receiving sleeve, said shell having a pair of openings aligned with said sleeve guideway, said clip comprising a V-shaped semi-resilient member having a pair of legs movably inserted in said shell openings and releasably engageable with said guideway to thereby releasably quick-connect couple said core and shell to said bracket subassembly.

13. The coupling assembly of claim 12 wherein a downstream outlet end of said core is operably coupled via said mounting bracket subassembly to a fuel fill outlet sleeve adapted to protrude from the tank wall opening into the tank interior, and one way check valve means operably supported by said outlet sleeve for preventing fuel back up into said core from the tank interior.

14. The coupling assembly of claim 13 wherein said outlet sleeve is integrally joined at its inlet end to said base flange and said base sleeve being integrally joined at its outlet end to said base flange, said outlet sleeve and base sleeve protruding coaxially in opposite directions from said base flange, and wherein said check valve means includes an annular valve seat on said outlet sleeve and a one way check valve member spring biased against said valve for yieldable opening travel in the direction of tank filling fuel flow and operable to thereby isolate said annular seal means from hydrostatic pressure of tank fuel when said valve member is closed.

15. The coupling assembly of claim 13 wherein said outlet sleeve is integrally joined at its inlet end to the outlet end of said core to thereby provide a one-piece core and check valve housing outlet sleeve of generally uniform outside diameter end-to-end.

16. The coupling assembly of claim 13 wherein said reinforcing clip-receiving sleeve member is embedment coupled to said base flange by being initially made as a separate component and then overmolded by the material of said base flange in the molding of said base flange.

17. The coupling assembly of claim 16 wherein an inlet end of said check valve outlet sleeve has an integral external flange joined to said flange base by overmold embedment in said base flange.

18. A fuel fill pipe to a fuel tank quick-connect coupling arrangement comprising, in combination, a fuel tank made of a polyethylene based material such as HDPE and having a fill opening formed through a wall of said tank, a quick-connect coupling assembly comprising a mounting bracket subassembly comprising a base molded of the same type of material as the fuel tank in the form of an annular flange sealably affixed to the exterior surface of the tank wall so as to surround the tank fill opening, said base having a cylindrical sleeve extending coaxially from said base flange, a fuel supply conduit coupling comprising a hollow cylindrical coupling core having an outlet end inserted coaxially and telescopically removably assembled into said base sleeve and having an inlet end protruding therefrom away from the tank wall and sealably coupled to a fuel fill conduit, annular seal means disposed between and slidably engaged with the exterior of said core and an interior surface of said base sleeve when said core and base sleeve are in telescopic assembly, said bracket subassembly further comprising a circumferentially continuous reinforcing member encircling said base sleeve and at least coextensive axially with the region containing said annular seals when said core is assembled in said base sleeve, and a coupling clip operable for movable interengagement between said conduit coupling and said mounting bracket for releasably retaining said fuel pipe in coupled relation to said fuel tank for fuel flow thereinto via said quick-connect coupling assembly.

19. A method of quick-connect coupling for connecting a fuel fill pipe to a fuel tank made of a polyethylene based material such as HDPE and having a fill opening formed through a wall of the tank comprising the steps of:

(1) providing a mounting bracket subassembly comprising a base, (2) molding said base of the same type of material as the fuel tank in the form of an annular flange, (3) sealably affixing the base flange to the exterior surface of the tank wall so as to surround the tank fill opening, (4) molding said base to further have a cylindrical sleeve extending coaxially from said base flange, (5) providing a fuel supply conduit coupling comprising a hollow cylindrical coupling core having an outlet end, (6) inserting said core outlet end coaxially and telescopically removably into said base sleeve such that an inlet end of said core protrudes therefrom away from said tank wall, (7) sealably coupling the inlet end of the core to a fuel fill conduit, (8) disposing annular seal means between and slidably engaging with the exterior of said core and an interior surface of said base sleeve when said core and base sleeve are in telescopic assembly, (9) providing a circumferentially continuous reinforcing member,

(10) closely encircling said bracket base sleeve with said reinforcing member at least coextensively axially with the region containing said annular seals when said core is assembled in said base sleeve,

(11) providing a coupling clip, and

(12) movable interengaging the coupling clip between said conduit coupling and said mounting bracket to thereby releasably retain said fuel pipe in quick-connect coupled relation to said fuel tank for fuel flow thereinto via said quick-connect coupling core.

20. The method of claim 19 wherein said reinforcing member is embedment coupled to said base flange by being initially made as a separate component and then overmolded by the material of said base flange in the molding of said base flange.

21. The method of claim 20 further comprising the steps of providing a fuel fill outlet sleeve protruding from the tank wall opening into the interior, operably coupling a downstream outlet end of said core via said mounting bracket substantially to an inlet end of said outlet sleeve subassembly, and providing a one way check valve means operably supported by said outlet sleeve for preventing fuel back up into said core from the tank interior.

22. The method of claim 21 further comprising integrally joining said reinforcing member at one of its axial ends to the inlet end of said check valve outlet sleeve, and providing at the other of the axial end of said reinforcing member an integral external flange, and joining said reinforcing member to said flange base by overmold embedment of said outlet sleeve external flange in said base flange.

23. The method of claim 22 comprising providing a coupling clip connector encircling said core when in coupling assembly, joining said connector to said base by providing an integral external flange on said connector and then overmolding said base flange onto said connector flange.

24. The method of claim 23 further comprising constructing and arranging said reinforcing member and said core outlet end such that they are disposed in assembly to protrude through the tank fill opening, and constructing and arranging said seals co-planar with or closely adjacent the tank wall such that said seals are generally sheltered by the tank from adverse external environmental heating effects.

* * * * *